(12) United States Patent
Kobayashi et al.

(10) Patent No.: US 10,834,349 B2
(45) Date of Patent: Nov. 10, 2020

(54) SOLID-STATE IMAGE SENSOR, IMAGE CAPTURING APPARATUS AND IMAGE CAPTURING METHOD

(71) Applicant: CANON KABUSHIKI KAISHA, Tokyo (JP)

(72) Inventors: Hirokazu Kobayashi, Tokyo (JP); Nobuhiro Takeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 85 days.

(21) Appl. No.: 16/027,651

(22) Filed: Jul. 5, 2018

(65) Prior Publication Data

US 2019/0014281 A1   Jan. 10, 2019

(30) Foreign Application Priority Data

Jul. 6, 2017  (JP) ................................ 2017-132737
Jun. 7, 2018  (JP) ................................ 2018-109660

(51) Int. Cl.
*H04N 5/378*   (2011.01)
*H04N 7/18*    (2006.01)

(52) U.S. Cl.
CPC .............. *H04N 5/378* (2013.01); *H04N 7/188* (2013.01)

(58) Field of Classification Search
CPC ............... H04N 5/379; H04N 5/37455; H04N 5/37452; G01T 1/248; G01J 1/44; G01J 2001/444; G01J 2001/442; H01L 31/107; H01L 27/14643
See application file for complete search history.

(56) References Cited

U.S. PATENT DOCUMENTS

| | | | |
|---|---|---|---|
| 2009/0315135 A1* | 12/2009 | Finkelstein | H01L 31/107 257/438 |
| 2011/0019934 A1* | 1/2011 | Ledinh | H04N 19/176 382/261 |
| 2016/0285444 A1* | 9/2016 | Denham | H03K 7/06 |
| 2017/0099422 A1* | 4/2017 | Goma | H01L 27/14609 |
| 2017/0131143 A1* | 5/2017 | Andreou | G01J 1/44 |
| 2018/0128921 A1* | 5/2018 | Mattioli Della Rocca | G01S 17/89 |

FOREIGN PATENT DOCUMENTS

JP   2005175719 A   6/2005
JP   2015173432 A   10/2015

* cited by examiner

*Primary Examiner* — Lin Ye
*Assistant Examiner* — Tuan H Le
(74) *Attorney, Agent, or Firm* — Carter, DeLuca & Farrell LLP

(57) ABSTRACT

A solid-state image sensor comprises: a plurality of pixels each provided with a sensor unit that generates a pulse signal at a frequency corresponding to a frequency of reception of photons; a first counter that counts a number of pulses generated by the sensor unit; and an output unit that outputs a signal corresponding to a count value counted by the first counter in a case where change in the number of pulses detected per unit time is greater than a threshold.

31 Claims, 10 Drawing Sheets

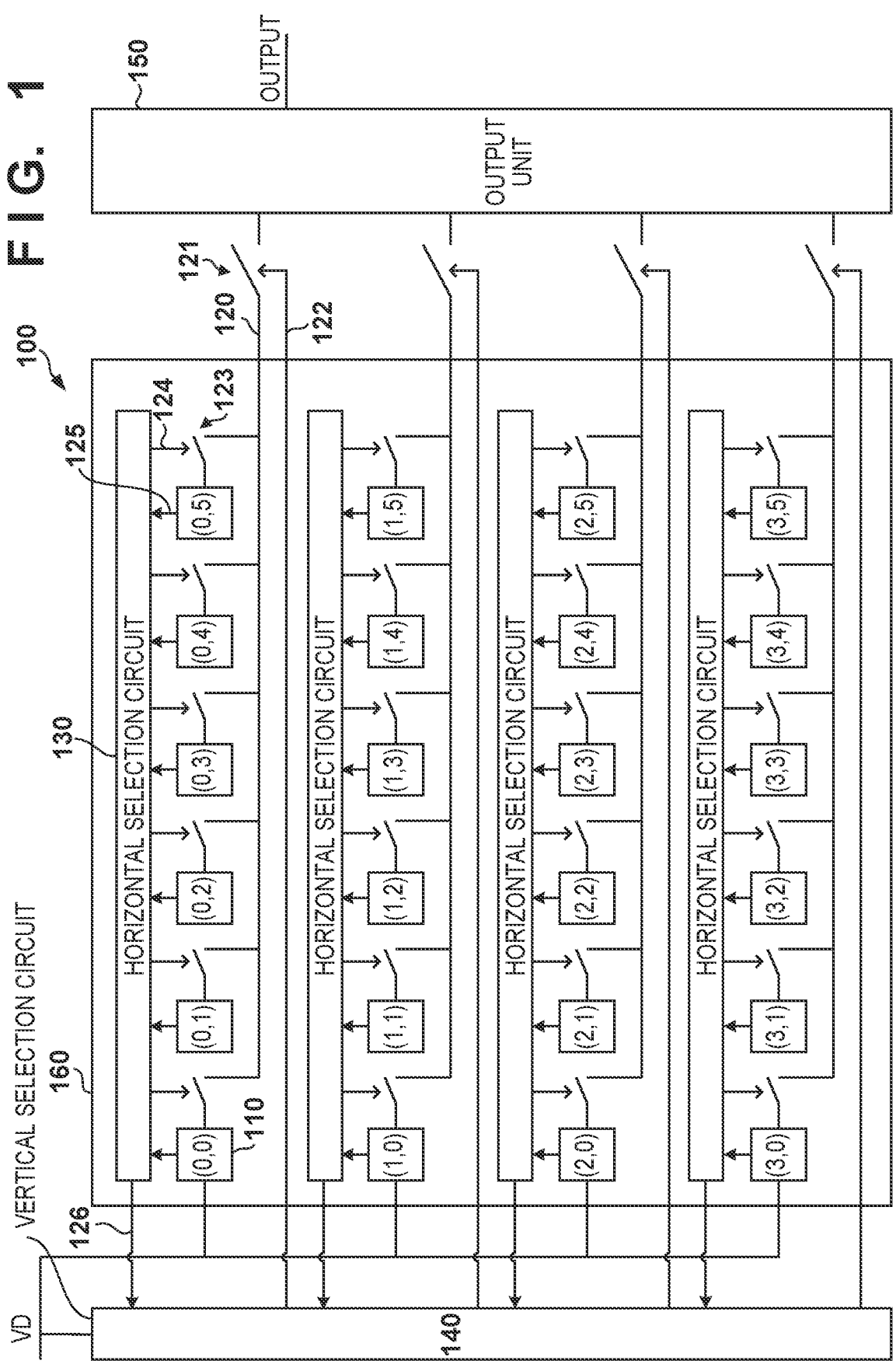

SOLID-STATE IMAGE SENSOR, IMAGE CAPTURING APPARATUS AND IMAGE CAPTURING METHOD

BACKGROUND OF THE INVENTION

Field of the Invention

The present invention relates to a solid-state image sensor, an image capturing apparatus and an image capturing method.

Description of the Related Art

In recent years, there has been proposed an image capturing apparatus capable of capturing an object with a sharper image than an image captured at a normal time when an object moves in the imaging area (Japanese Patent Laid-Open No. 2005-175719). In addition, as an image sensor of a new type, an image sensor as disclosed in Japanese Patent Laid-Open No. 2015-173432 has been proposed. In the image sensor disclosed in Japanese Patent Laid-Open No. 2015-173432, the following signal processing circuits are provided for each pixel. Namely, each pixel is provided with a storage capacitor for accumulating electric charge generated by the photoelectric conversion element, a comparator for comparing the voltage of the storage capacitor with a reference voltage, and outputting a pulse when the voltages coincide with each other, and reset means for resetting the voltage of the storage capacitor to a reset voltage in response to the output from the comparator.

However, in some cases, good image capturing cannot always be performed with the conventional technique.

SUMMARY OF THE INVENTION

The present invention has been made in consideration of the above situation, and provide a solid-state image sensor, image capturing apparatus, and image capturing method capable of performing good imaging.

According to the present invention, provided is a solid-state image sensor comprising: a plurality of pixels each provided with a sensor unit that generates a pulse signal at a frequency corresponding to a frequency of reception of photons; a first counter that counts a number of pulses generated by the sensor unit; and an output unit that outputs a signal corresponding to a count value counted by the first counter in a case where change in the number of pulses detected per unit time is greater than a threshold.

Further, according to the present invention, provided is an image capturing apparatus comprising: a solid-state image sensor comprising a plurality of pixels each provided with a sensor unit that generates a pulse signal at a frequency corresponding to a frequency of reception of photons, a counter that counts a number of pulses generated by the sensor unit, and an output unit that outputs a signal corresponding to a count value counted by the counter in a case where change in the number of pulses detected per unit time is greater than a threshold; and an image processing unit that performs predetermined image processing using the signal output from the solid-state image sensor.

Furthermore, according to the present invention, provided is an image capturing method comprising: outputting a signal corresponding to a count value counted by a counter that counts a number of pulses generated by a sensor unit in a case where change in the number of pulses generated per unit time by the sensor unit of each of a plurality of pixels each including the sensor unit that generates a pulse signal at a frequency corresponding to a frequency of reception of photons is greater than a threshold; and performing predetermined image processing using the signal corresponding to the count value counted by the counter.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a diagram showing a solid-state image sensor according to a first embodiment;

DESCRIPTION OF THE EMBODIMENTS

Exemplary embodiments of the present invention will be described in detail in accordance with the accompanying drawings.

It should be noted that the present invention is not limited to the following embodiments and can be appropriately changed. In addition, the following embodiments may be appropriately combined.

First Embodiment

A solid-state image sensor, an image capturing apparatus and an image capturing method according to a first embodiment will be described with reference to FIGS. 1 to 5. FIG. 1 is a diagram showing a solid-state image sensor according to the first embodiment.

As shown in FIG. 1, a solid-state image sensor 100 of the present embodiment includes an imaging unit (imaging area, pixel array area) 160, a horizontal selection circuit (horizontal scanning circuit) 130, a vertical selection circuit (vertical scanning circuit) 140, and an output unit 150.

Figure 4:
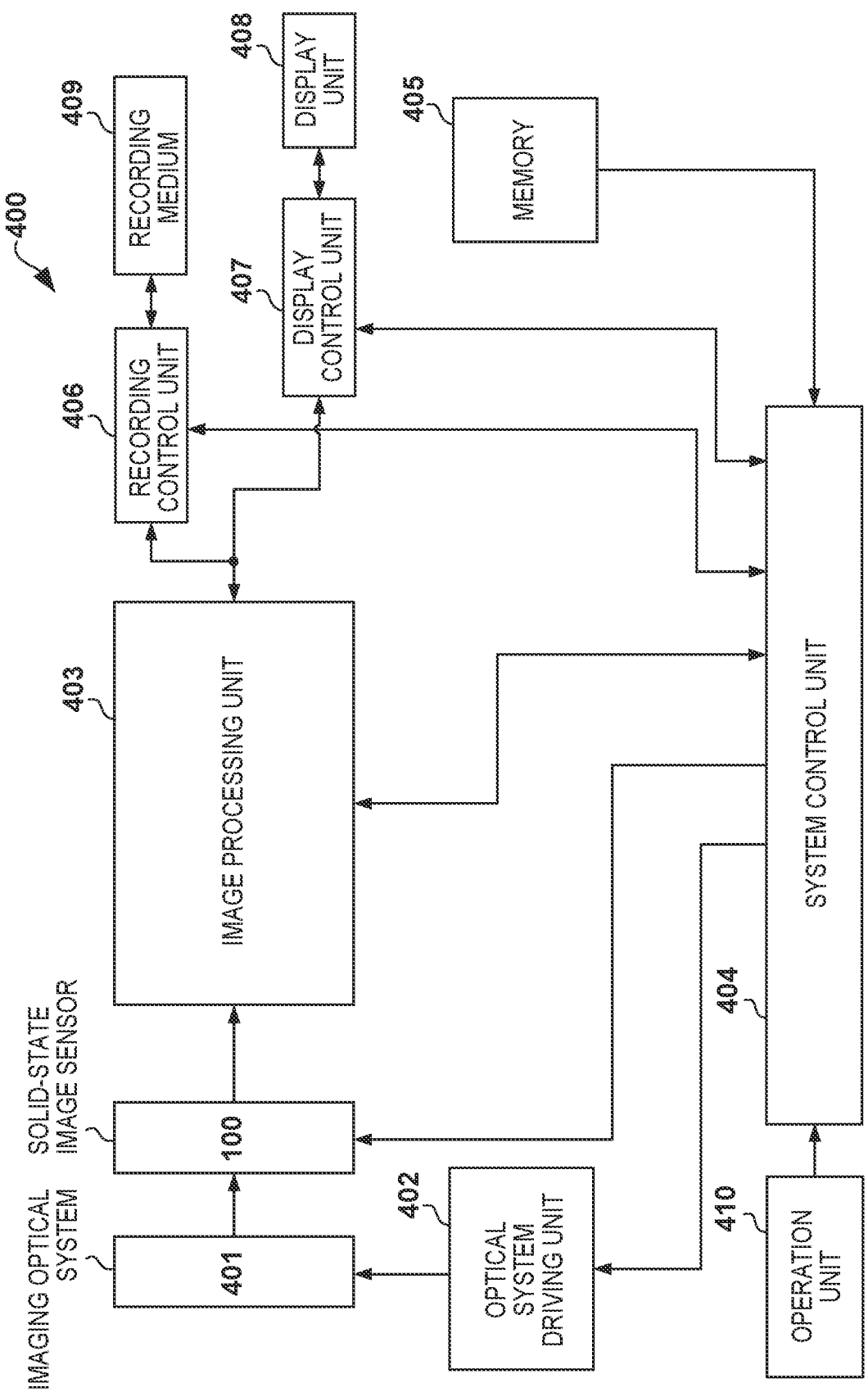
FIG. 4 is a block diagram showing an image capturing apparatus according to the first embodiment.

In the imaging unit 160, a plurality of pixels 110 are arranged in a matrix. Here, for the sake of simplicity of explanation, 24 pixels 110 are shown, but in reality, a large number of pixels 110 are provided in the imaging unit 160. (p, q) (p, q are integers, respectively) attached to each pixel 110 indicates the coordinates of the pixel 110. p indicates a row number, and q indicates a column number. A synchronizing signal VD is supplied to each pixel 110 from a system control unit 404 (FIG. 4) (see FIG. 2B). The imaging unit 160 receives the optical image formed by an imaging optical system 401 (FIG. 4). The number of photons incident on each pixel 110 is counted in each pixel 110. An output signal corresponding to the number of photons counted in the pixel 110 is output to the output unit 150 via a horizontal output line 120. Signals acquired by the pixels 110 located in the same row are transmitted to the output unit 150 via the same horizontal output line 120. Here, although four horizontal output lines are shown, in reality, a large number of output signal lines are provided. For each horizontal output line 120, a switch 121 is provided. The output signal output from the pixel 110 is transmitted to the output unit 150 via the horizontal output line 120 and the switch 121.

For each row of the imaging unit 160, the horizontal selection circuit 130 is provided. Although the case where the horizontal selection circuit 130 is provided in the imaging unit 160 will be described as an example here, a horizontal selection circuit 130 may be provided outside the imaging unit 160. Information indicating whether or not the pixel 110 is to be read is supplied from the pixel 110 to the horizontal selection circuit 130 via a signal line 125. For example, when the difference between the pixel value of the pixel 110 in the previous frame and the pixel value of the pixel 110 in the current frame is equal to or less than a threshold value TH, information indicating that the pixel 110 is not to be read is supplied from the pixel 110 to the horizontal selection circuit 130 via the signal line 125. On the other hand, when the difference between the pixel value of the pixel 110 in the previous frame and the pixel value of the pixel 110 in the current frame is larger than the threshold value TH, information indicating that the pixel 110 is to be read is supplied from the pixel 110 to the horizontal selection circuit 130 via the signal line 125. The horizontal selection circuit 130 stores such information supplied from each pixel 110, respectively. Based on such information supplied from each pixel 110, the horizontal selection circuit 130 outputs information indicating the number of pixels 110 to be read out among the pixels 110 located in the row in which the horizontal selection circuit 130 is provided, via a signal line 126 to the vertical selection circuit 140. During the read process, the horizontal selection circuit 130 sequentially selects the pixels 110 to be read out from the plurality of pixels 110 located in the row provided with the horizontal selection circuit 130 in the horizontal direction. The signal output from the pixel 110 is transmitted to the horizontal output line 120 via a switch 123. The switch 123 is controlled by a signal supplied from the horizontal selection circuit 130 via a read control line 124. When reading the signal from the pixel 110 to be read, the horizontal selection circuit 130 turns on the switch 123 provided in the output signal line of the pixel 110. The horizontal selection circuit 130 performs a read process on the pixel 110 to be read in the ascending order of the column number q. The horizontal selection circuit 130 does not perform a read process on the pixel 110 that is not to be read.

The vertical selection circuit 140 is provided with a plurality of read control lines 122 extending in the horizontal direction. Here, although four read control lines 122 are shown, in practice, a large number of read control lines 122 are provided. To the vertical selection circuit 140, a synchronizing signal (vertical synchronizing signal) VD is supplied from the system control unit 404 (see FIG. 4). As described above, information indicating the number of pixels 110 to be read is supplied from the horizontal selection circuit 130 provided in each row to the vertical selection circuit 140 via the signal line 126. The vertical selection circuit 140 stores the number of pixels 110 to be read in each row. In the read process, the vertical selection circuit 140 sequentially selects the row in which the pixel 110 to be read exists, that is, the row to be read in the vertical direction. Read process is not performed on a row in which there is no pixel 110 to be read. The vertical selection circuit 140 selects a row to be read by turning on the switch 121 via the read control line 122. The vertical selection circuit 140 selects the row for a period of time corresponding to the number of pixels 110 to be read which are present in the row. When there are many pixels 110 to be read in the selected row, the time for which the row is selected becomes longer, and when there are not many pixels 110 to be read in the selected row, the time for which the row is selected becomes shorter.

While the row selection is appropriately performed in the vertical direction by the vertical selection circuit 140, the pixel 110 is appropriately selected in the horizontal direction by the horizontal selection circuit 130, whereby a signal is read out from the pixel 110 to be read. Signals respectively read from the pixels 110 to be read are supplied to the output unit 150 via the horizontal output lines 120. The output unit 150 generates an output signal OUTPUT using signals sequentially supplied from the imaging unit 160. The output unit 150 outputs the output signal OUTPUT to the outside of the solid-state image sensor 100 using, for example, low voltage differential signaling (LVDS) technology or the like. At this time, the output unit 150 outputs information indicating the coordinates (p, q) of the pixel 110 to be read together with the signal read from the pixel 110. The solid-state image sensor 100 concurrently performs a read process for the nth frame and an exposure process of the (n+1)th frame based on the synchronizing signal VD.

Figure 2A:
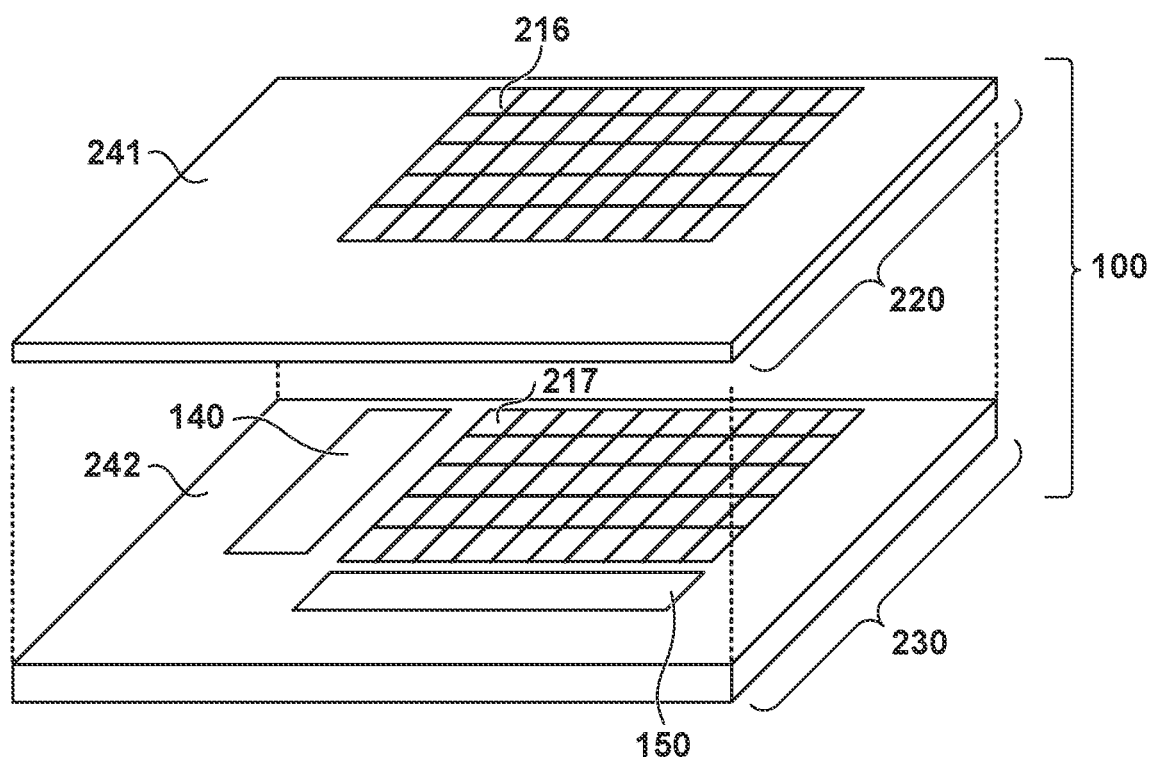
FIGS. 2A and 2B are diagrams showing the solid-state image sensor according to the first embodiment.
Figure 2B:
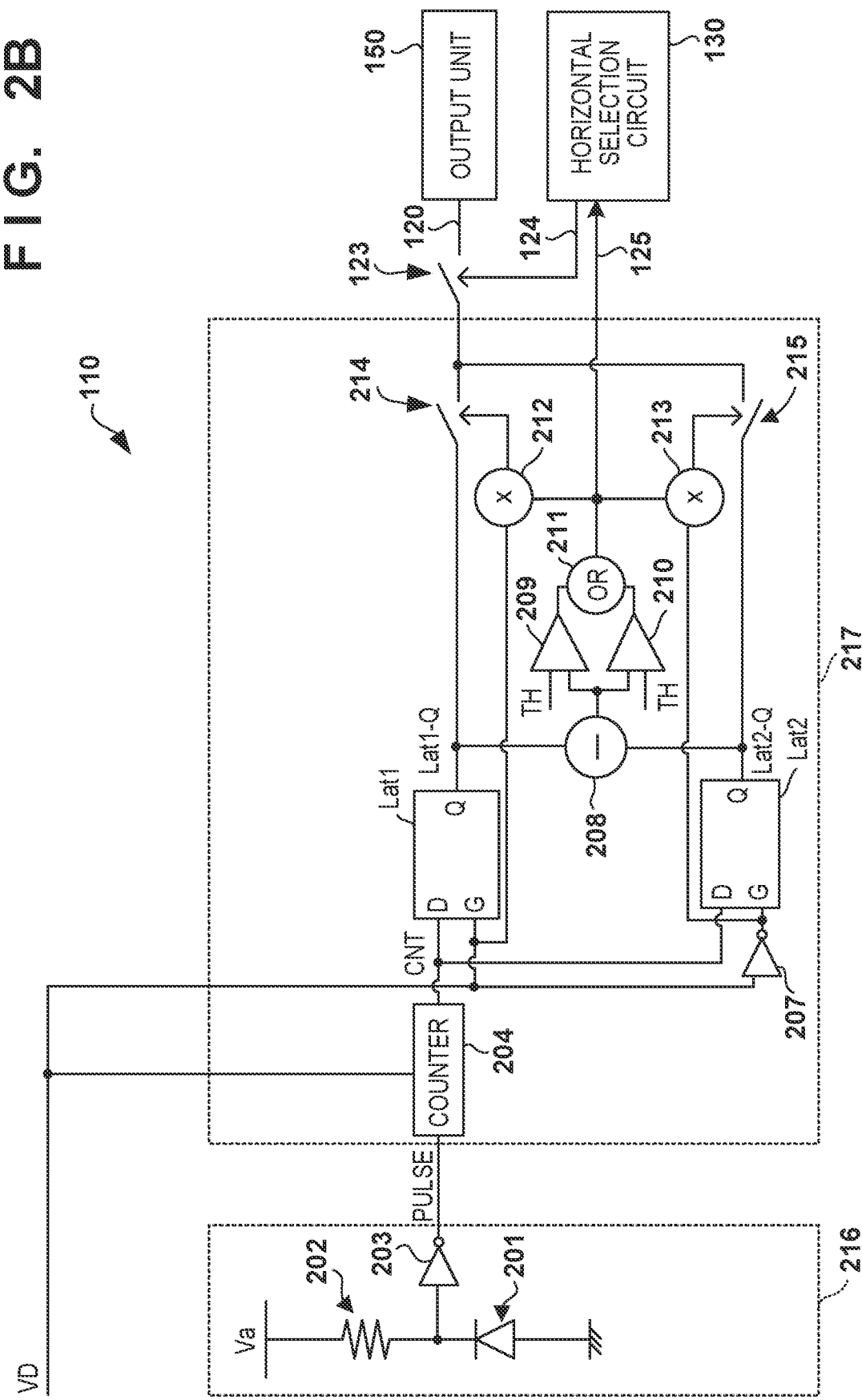

FIGS. 2A and 2B are diagrams showing a solid-state image sensor according to the present embodiment. FIG. 2A is a perspective view showing a solid-state image sensor according to the present embodiment. As shown in FIG. 2A, the solid-state image sensor 100 is configured by stacking two substrates (semiconductor chips) 220 and 230. FIG. 2B shows the pixel 110 provided in the solid-state image sensor 100 according to the present embodiment. In FIG. 2B, one pixel 110 of a plurality of pixels 110 provided in the solid-state image sensor 100 is extracted and shown.

As shown in FIG. 2A, the solid-state image sensor 100 includes the substrate (upper substrate) 220 for receiving an optical image formed by the imaging optical system 401, the substrate (lower substrate) 230 mainly including a digital circuit. As shown in FIG. 2B, the pixel 110 is composed of a sensor unit (light receiving portion, pixel unit) 216 and a counting unit 217. The sensor unit 216 in the pixel 110 is formed on the substrate 220. The counting unit 217 of the pixel 110 is formed on the substrate 230. A plurality of sensor units 216 are arranged in a matrix on a substrate 220. A plurality of counting units 217 are arranged in a matrix on the substrate 230. The plurality of sensor units 216 and the plurality of counting units 217 corresponding to these sensor units 216, respectively, are electrically connected to each other. In this way, a plurality of pixels 110 are arranged in a matrix. The sensor unit 216 is provided with a photodiode 201, a quenching element 202, and an inverter 203. Since the sensor unit 216 is provided with the inverter 203, the waveform-shaped pulse signal PULSE is transmitted from the sensor unit 216 to the counting unit 217. Therefore, the transmission from the sensor unit 216 to the counting unit 217 is relatively robust. In the counting unit 217, a counter 204, latch circuits (latch units) Lat1 and Lat2, an inverter 207, a subtracter 208, comparators 209 and 210, an OR circuit 211, multipliers 212 and 213, and switches 214 and 215 are provided. The vertical selection circuit 140 and the output unit 150 are provided in one of a peripheral circuit portion 241 of the substrate 220 and a peripheral circuit portion 242 of the substrate 230. Here, a case where the vertical selection circuit 140 and the output unit 150 are arranged in the peripheral circuit portion 242 of the substrate 230 will be described as an example. In FIG. 2A, the horizontal selection circuit 130 is omitted and not shown. The horizontal selection circuits 130 are provided on the substrate 230, for example.

As described above, in this embodiment, the sensor unit 216 is formed on the substrate 220, and the counting unit 217 is formed on the substrate 230. Since the counting unit 217 having a large circuit scale is provided on the substrate 230 that is different from the substrate 220 which is provided with the sensor unit 216, the area of the sensor unit 216 can be sufficiently secured. Therefore, the opening area of the sensor unit 216 can be sufficiently secured.

As the photodiode 201, an avalanche photodiode capable of detecting a single photon, that is, SPAD (Single Photon Avalanche Diode) is used. The anode of the photodiode 201 is connected to the ground voltage, and the cathode of the photodiode 201 is connected to one end of the quenching element 202. A bias voltage Va is applied to the other end of the quenching element 202. A bias voltage Va greater than the breakdown voltage of the photodiode 201 can be applied to the photodiode 201 via the quenching element 202. Therefore, the photodiode 201 can operate in an operation mode so-called a Geiger mode. That is, when a photon enters the photodiode 201, it causes an avalanche multiplication phenomenon. This results in an avalanche current being generated, and causes a voltage drop at the quenching element 202. The quenching element 202 is a resistive element for stopping the avalanche multiplication phenomenon of the photodiode 201. Here, the quenching element 202 is configured by using the resistance component of the MOS transistor. When an avalanche current is generated by the avalanche multiplication phenomenon, a voltage drop occurs in the quenching element 202, and the bias voltage applied to the photodiode 201 falls. When the bias voltage falls below the breakdown voltage of photodiode 201, the avalanche multiplication phenomenon stops. As a result, the avalanche current does not flow, and the bias voltage Va is again applied to the photodiode 201. The cathode of the photodiode 201 and one end of the quenching element 202 are connected to an input terminal of inverter 203. An output terminal of the inverter 203 is connected to the input terminal of the counter 204. Since the above phenomenon occurs when a photon enters the photodiode 201, a voltage change occurs at the input terminal of the inverter 203. The inverter 203 generates a pulse signal PULSE in response to the voltage change, and outputs the generated pulse signal PULSE to the counter 204. In this way, the waveform-shaped pulse signal PULSE is output from the inverter 203. As described above, in the sensor unit 216 including the photodiode 201, the quenching element 202, and the inverter 203, when a photon enters the photodiode 201, the pulse signal PULSE is output from the inverter 203 with a frequency corresponding to the photon reception frequency. More specifically, when one photon enters photodiode 201, one pulse signal PULSE is output from inverter 203. The bias voltage Va can be, for example, about +20 V, but it is not limited thereto. For example, the anode of the photodiode 201 may be connected to a negative potential.

The pulse signal PULSE output from the inverter 203 is input to a clock terminal of the counter 204. The counter 204 counts the number of the pulse signals PULSE. The bit width of the counter 204 can be, for example, 16, but the present invention is not limited thereto. The synchronizing signal VD is supplied to a reset terminal of the counter 204. The counter 204 resets the count value CNT to an initial value, namely, 0, when the polarity of the synchronizing signal VD changes. More specifically, the counter 204 resets the count value CNT to the initial value when the synchronizing signal VD changes from Low level to High level. Further, the counter 204 resets the count value CNT to the initial value when the synchronizing signal VD changes from High level to Low level. An output terminal of the counter 204 is connected to D terminals of the latch circuits Lat1 and Lat2. Therefore, the count value CNT output from the counter 204 is input to the D terminals of the latch circuits Lat1 and Lat2.

The synchronizing signal VD is supplied to a G terminal of the latch circuit Lat1. The synchronizing signal VD is supplied to a G terminal of the latch circuit Lat2 via the inverter 207. The latch circuit Lat1 records the count value CNT output from the counter 204 when the synchronizing signal VD changes from Low level to High level. On the other hand, the latch circuit Lat2 records the count value CNT output from the counter 204 when the synchronizing signal VD changes from High level to Low level. A Q terminal of the latch circuit Lat1 is connected to the horizontal output line 120 via switches 214 and 123. Further, a Q terminal of the latch circuit Lat2 is connected to the horizontal output line 120 via switches 215 and 123. The Q terminal of the latch circuit Lat1 is connected to one input terminal of the subtracter 208 and the Q terminal of the latch circuit Lat2 is connected to the other input terminal of the subtracter 208. A difference between the count value Lat1-Q output from the Q terminal of the latch circuit Lat1 and the count value Lat2-Q output from the Q terminal of the latch circuit Lat2 is obtained by the subtracter 208. The difference (difference value) obtained by the subtracter 208 is input to the comparators 209 and 210. The comparator 209 judges whether or not the difference value obtained by the subtracter 208 is larger than a threshold value TH, and outputs a High level signal when the difference value is larger than the threshold value TH. The comparator 209 judges whether or not the difference value obtained by the subtracter 208 is smaller than a threshold value −TH, and outputs a High level signal when the difference value is smaller than the threshold value −TH. Output terminals of the comparators 209 and 210 are connected to input terminals of the OR circuit 211, respectively. The OR circuit 211 outputs a High level signal when at least one of the signals output from the comparators 209 and 210 becomes High level. The signal output from the OR circuit 211 is input to the multipliers 212 and 213. To the multiplier 212, the synchronizing signal VD and the output signal of the OR circuit 211 are input. When the synchronizing signal VD is at High level and the output signal of the OR circuit 211 is at High level, the output of the multiplier 212 becomes High level. The switch 214 is controlled by a signal output from the multiplier 212. When the synchronizing signal VD is at High level and the output signal of the OR circuit 211 is at High level, the switch 214 is in the ON state. That is, when the synchronizing signal VD is at High level and the difference between the count values Lat1-Q and Lat2-Q of the latch circuits Lat1 and Lat2 is larger than the threshold value TH, the count value Lat1-Q of the latch circuit Lat1 is outputted from the pixel 110 via the switch 214. To the multiplier 213, a signal obtained by inverting the synchronizing signal VD by the inverter 207 and an output signal of the OR circuit 211 are input. When the synchronizing signal VD is at Low level and the output signal of the OR circuit 211 is at High level, the output of the multiplier 213 becomes High level. The switch 215 is controlled by a signal output from the multiplier 213. When synchronizing signal VD is at Low level and the output signal of OR circuit 211 is at High level, the switch 215 becomes an ON state. That is, when the synchronizing signal VD is at Low level and the difference between the count values Lat1-Q and Lat2-Q of the latch circuits Lat1 and Lat2 is larger than the threshold value TH, the count value Lat2-Q of the latch circuit Lat2 is output from the pixel 110 through the switch 215. The signal output from the OR circuit 211 is input to the horizontal selection circuit 130 via the signal line 125. When the difference between the count values Lat1-Q and Lat2-Q of the latch circuits Lat1 and Lat2 is larger than the threshold value TH, that is, if the pixel 110 is the pixel to be read, the High level signal outputted from the OR circuit 211 is supplied to the horizontal selection circuit 130. On the other hand, when the difference between the count values Lat1-Q and Lat2-Q of the latch circuits Lat1 and Lat2 is equal to or smaller than the threshold value TH, that is, if the pixel 110 is not the pixel to be read, the Low level signal output from the OR circuit 211 is supplied to the horizontal selection circuit 130. Thus, if the pixel 110 is a pixel to be read, for example, "1" is stored in the horizontal selection circuit 130, and if the pixel 110 is not a pixel to be read, for example, "0" is stored.

Figure 3:
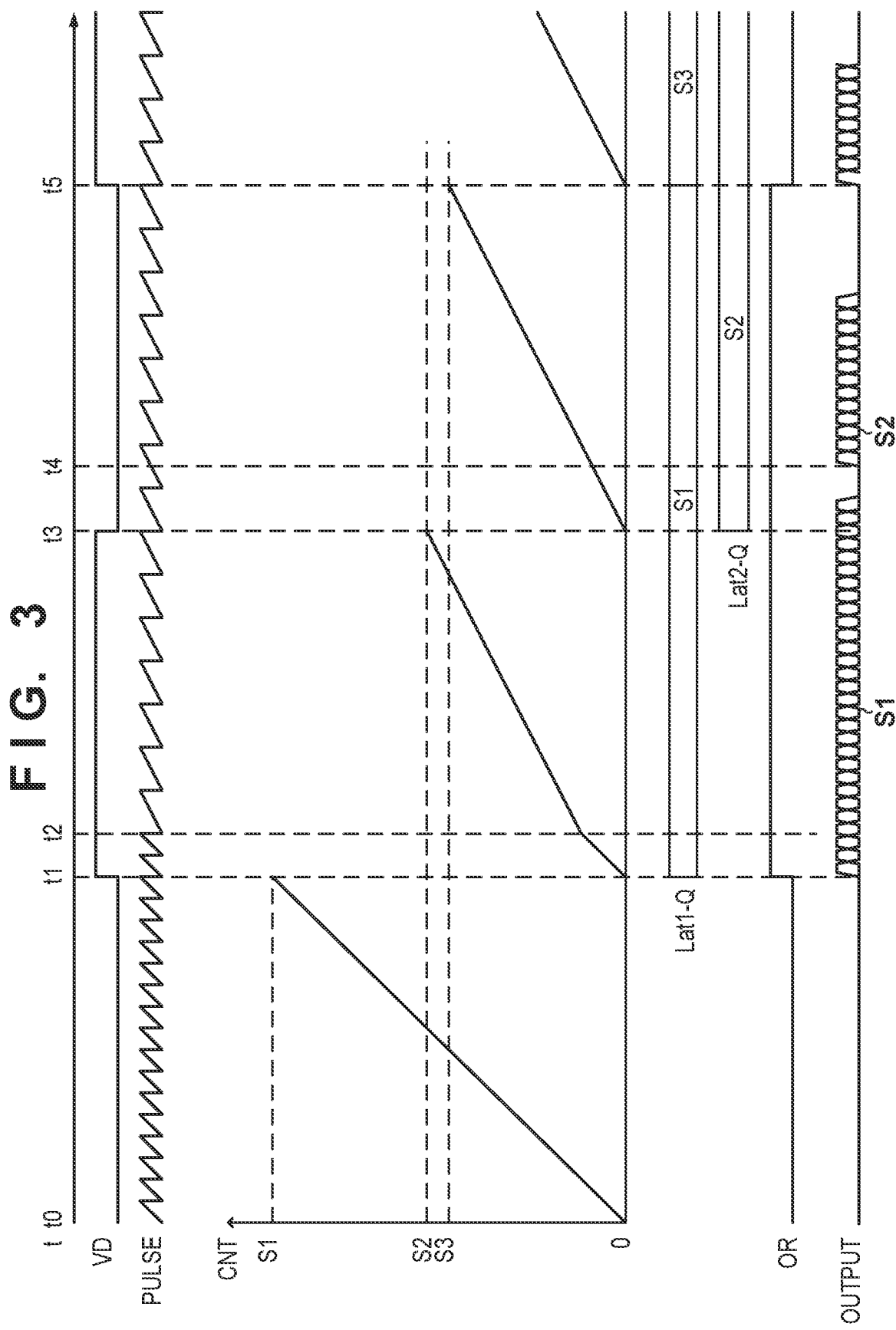
FIG. 3 is a timing chart showing an example of an operation of the solid-state image sensor according to the first embodiment.

FIG. 3 is a timing chart showing an example of the operation of the solid-state image sensor according to the embodiment. Here, description is made focusing on the operation of one pixel 110 among the plurality of pixels 110. In FIG. 3, timing charts corresponding to three frames out of a plurality of frames constituting a moving image are shown. A period from time t0 to time t1 corresponds to a shooting period of the first frame. A period from time t1 to time t3 corresponds to a shooting period of the second frame. A period from time t3 to time t5 corresponds to the shooting period of the third frame. Time t5 corresponds to the start timing of a shooting period of the fourth frame.

As shown in FIG. 3, in the period from time t0 to time t1, which is the shooting period of the first frame, the synchronizing signal VD becomes Low level. In the period from time t1 to time t3, which is the shooting period of the second frame, the synchronizing signal VD becomes High level. In the period from time t3 to time t5, which is the shooting period of the third frame, the synchronizing signal VD goes to Low level. At time t5 at the start of the shooting period of the fourth frame, the synchronizing signal VD becomes High level. The pulse signal PULSE shown in FIG. 3 is conceptually described, and the rising waveform of the pulse signal PULSE is actually steep.

At time t0, the counter 204 starts counting the pulse signal PULSE.

At time t1, the synchronizing signal VD changes from Low level to High level. Since the synchronizing signal VD is input to the G terminal of the latch circuit Lat1, at time t1, the potential of the G terminal of the latch circuit Lat1 changes from Low level to High level. When the potential of the G terminal of the latch circuit Lat1 changes from Low level to High level, the latch circuit Lat1 stores the count value CNT input to the D terminal of the latch circuit Lat1. The count value CNT of counter 204 at time t1 is S1 in an example shown in FIG. 3. Therefore, the latch circuit Lat1 stores the count value S1 as a pixel value. Since time t1 is the end timing of the shooting period of the first frame, or the start frame, the count value stored in the latch circuit Lat2 is 0. Therefore, the difference between the count values Lat1-Q and Lat2-Q of the latch circuits Lat1 and Lat2 is larger than the threshold value TH, and a High level signal is output from the OR circuit 211. The High level signal output from the OR circuit 211 is supplied to the horizontal selection circuit 130. Since the signal supplied from the OR circuit 211 is at High level, the horizontal selection circuit 130 stores the pixel 110 as a pixel to be read. The horizontal selection circuit 130 controls the switch 123 at an appropriate timing so that the signal acquired by the pixel 110 to be read is read out. The High level signal output from the OR circuit 211 is also supplied to the multiplier 212. Since the synchronizing signal VD is at High level and the signal supplied from the OR circuit 211 is also at High level, the output of the multiplier 212 becomes High level. As the output of the multiplier 212 becomes High level, the switch 214 is turned on, and the count value S1 output from the latch circuit Lat1 can be transmitted to the output unit 150 via the horizontal output line 120. The High level signal output from the OR circuit 211 is also supplied to the multiplier 213. Since the signal obtained by inverting the synchronizing signal VD is Low level and the signal from the OR circuit 211 is High level, the output of the multiplier 213 becomes Low level. As the output of the multiplier 213 becomes Low level, the switch 215 is turned off, and the count value 0 of the latch circuit Lat2 is not transmitted to the output unit 150 via the horizontal output line 120. The output unit 150 generates an output signal OUTPUT using signals sequentially supplied from the imaging unit 160, and outputs the generated output signal OUTPUT to the outside of the solid-state image sensor 100. In FIG. 3, reference numeral S1 shown in the output signal OUTPUT indicates a signal outputted from one pixel 110 of interest in the above description. Thus, at time t1, the shooting of the first frame is completed. Then, the output of the image signal of the first frame starts at time t1.

In the example shown in FIG. 3, at time t2, the intensity of light incident on the pixel 110 decreases. For this reason, an increase amount of the count value CNT per unit time changes at time t2. Therefore, the count value at time t3 becomes S2 which is smaller than the count value S1 at time t1. At time t3, the synchronizing signal VD changes from High level to Low level. Since the signal obtained by inverting the synchronizing signal VD by the inverter 207 is input to the G terminal of the latch circuit Lat2, at time t3, the potential of the G terminal of the latch circuit Lat2 changes from Low level to High level. When the potential of the G terminal of the latch circuit Lat2 changes from Low level to High level, the latch circuit Lat2 stores the count value CNT of the counter 204 input to the D terminal of the latch circuit Lat2. In this manner, the latch circuit Lat1 and the latch circuit Lat2 alternately store the count value of the counter 204 every unit time corresponding to the synchronizing signal VD. The count value CNT of counter 204 at time t3 is S2. Therefore, the latch circuit Lat2 stores the count value S2 as a pixel value. Since time t3 is the end timing of the shooting period of the second frame, the latch circuit Lat1 stores the count value S1 obtained in the shooting period of the first frame. Here, a case where the difference between the count value S1 and the count value S2 is larger than the threshold value TH will be described as an example. Since the difference between the count values S1 and S2 of the latch circuits Lat1 and Lat2 is larger than the threshold value TH, a High level signal is output from the OR circuit 211. Since the signal supplied from the OR circuit 211 is at High level, the horizontal selection circuit 130 stores the pixel 110 as the pixel to be read. The horizontal selection circuit 130 controls the switch 123 at an appropriate timing so that the signal acquired by the pixel 110 to be read is read out. The High level signal output from the OR circuit 211 is also supplied to the multiplier 213. Since the signal obtained by inverting synchronizing signal VD at inverter 207 is High level and the signal from OR circuit 211 is also High level, the output of multiplier 213 becomes High level. As the output of the multiplier 213 is at High level, the switch 215 is turned on, and the count value S2 output from the latch circuit Lat2 can be transmitted to the output unit 150 via the horizontal output line 120. The High level signal output from the OR circuit 211 is also supplied to the multiplier 212. Since the synchronizing signal VD is at Low level and the signal from the OR circuit 211 is at High level, the output of the multiplier 212 is at Low level. As the output of the multiplier 212 is at Low level, the switch 214 is turned off, and the count value S1 stored in the latch circuit Lat1 is not transmitted to the output unit 150 via the horizontal output line 120. The output unit 150 generates an output signal OUTPUT using signals sequentially supplied from the imaging unit 160, and outputs the generated output signal OUTPUT to the outside of the solid-state image sensor 100. In FIG. 3, reference numeral S2 shown in the output signal OUTPUT indicates a signal outputted from one pixel 110 of interest in the above description. Thus, at time t3, the shooting of the second frame is completed. Then, the output of the image signal of the second frame starts after time t3. Here, the case where the output of the image signal of the first frame is not completed at time t3 will be described as an example. In such a case, the output of the image signal of the second frame is started at time t4 after time t3. It should be noted that the reason why the output of the image signal of the first frame is not completed at time t3 is that it is necessary to read the signals acquired by all the pixels 110 for the first frame. When reading the image signal of the second frame, there may be some pixels 110 which are not to be read. When there are some pixels 110 that are not to be read, the time required for reading is reduced.

In the above description, the case where the signals acquired by all the pixels 110 provided in the imaging unit 160 are read out when reading the image signal of the first frame has been described by way of example, the present invention is not limited thereto. For example, spatial decimation may be performed to reduce the number of the pixels 110 to be read to shorten the read time of the image signal of the first frame. In this way, it is possible to complete the reading of the image signal of the first frame before time t3.

The count value at time t5 becomes S3 with a relatively small difference from the count value S2 at time t3. At time t5, the synchronizing signal VD changes from Low level to High level. Since the synchronizing signal VD is input to the G terminal of the latch circuit Lat1, at time t5, the potential of the G terminal of the latch circuit Lat1 changes from Low level to High level. When the potential of the G terminal of the latch circuit Lat1 changes from Low level to High level, the latch circuit Lat1 stores the count value CNT input to the D terminal of the latch circuit Lat1. In the example shown in FIG. 3, the count value CNT of counter 204 at time t5 is S3. Therefore, the latch circuit Lat1 stores the count value S3 as a pixel value. As time t5 is the end timing of the shooting period of the third frame, the latch circuit Lat2 stores the count value S2 obtained in the shooting period of the second frame. Here, a case where the difference between the count value S2 and the count value S3 is equal to or less than the threshold value TH will be described as an example. Since the difference between the count values S2, S3 of the latch circuit Lat1, Lat2 is less than or equal to the threshold value TH, the signal output from the OR circuit 211 becomes Low level. As the signal supplied from the OR circuit 211 is Low level, the horizontal selection circuit 130 stores the pixel 110 as a pixel not to be read. The horizontal selection circuit 130 controls the switch 123 so that the signal acquired by the pixel 110 is not read out. The Low level signal output from the OR circuit 211 is also supplied to the multiplier 212. Since the synchronizing signal VD is at High level and the signal from the OR circuit 211 is at Low level, the output of the multiplier 212 becomes Low level. As the output of the multiplier 212 is at the Low level, the switch 214 is turned off, and the count value S3 of the latch circuit Lat1 is not transmitted to the output unit 150 via the horizontal output line 120. The Low level signal output from the OR circuit 211 is also supplied to the multiplier 213. Since the signal obtained by inverting the synchronizing signal VD by the inverter 207 is Low level and the signal from the OR circuit 211 is Low level, the output of the multiplier 212 becomes Low level. Since the output of the multiplier 213 is at Low level, the switch 215 is turned off, and the count value S2 stored in the latch circuit Lat2 is not transmitted to the output unit 150 via the horizontal output line 120. The output unit 150 outputs the output signal OUTPUT generated using the signals sequentially supplied from the imaging unit 160 to the outside of the solid-state image sensor 100. Thus, at time t5, the shooting of the third frame is completed. Then, reading of the image signal of the third frame starts at time t5. Even when reading the image signal of the third frame, there may be some pixels 110 which is not to be read, so the time required for reading is shortened.

As described above, according to the present embodiment, when the difference between the pixel value in the previous frame and the pixel value in the current frame is equal to or less than the threshold value, the pixel 110 is not to be read. Therefore, according to the present embodiment, it is possible to shorten the time required for reading image signals.

FIG. 4 is a block diagram showing the image capturing apparatus according to the present embodiment. The imaging optical system 401 is provided with a focus lens, a zoom lens, an aperture, and so forth. The imaging optical system 401 forms an optical image of a subject and inputs the formed optical image to the imaging surface of the solid-state image sensor 100. The solid-state image sensor 100 captures the optical image formed by the imaging optical system 401 as described above. The solid-state image sensor 100 outputs an output signal OUTPUT obtained by shooting to an image processing unit 403.

The image processing unit 403 performs predetermined image processing based on an image signal OUTPUT output from the solid-state image sensor 100. More specifically, the image processing unit 403 generates an image of each frame as follows. For the first frame, pixel values are read out from all the pixels 110 provided in the imaging unit 160 as described above. Therefore, the image processing unit 403 generates the first frame based on the pixel values of all of the pixels 110 that have been read. In the read process of the second and subsequent frames, there may be pixels 110 which are not to be read as described above. Therefore, the image processing unit 403 updates the previous frame by using the pixel value of the pixel 110 from which the image has been read. Regarding the portion corresponding to the pixel 110 that has been read, the pixel value is updated. On the other hand, the pixel value is not updated for the portion corresponding to the pixel 110 that has not been read. Since the image signal OUTPUT output from the solid-state image sensor 100 includes information indicating the coordinates (p, q) of the pixel 110 that has been read, the image processing unit 403 selectively updates only the portion corresponding to the pixel 110 that has been read. In the process of generating an image, the image processing unit 403 may also perform processing such as rearrangement of signals, correction of defective pixels, noise reduction, color conversion, white balance correction, gamma correction, resolution conversion, data compression, three-plane synchronization, sharpness adjustment.

A memory 405 is used when the image processing unit 403 performs arithmetic processing and the like. As the memory 405, for example, a DRAM (Dynamic Random Access Memory), a flash memory, or the like may be used. The memory 405 can also be used as a buffer memory in continuous shooting. The system control unit (processing unit) 404 governs the overall control of the image capturing apparatus 400 according to this embodiment. The system control unit 404 is provided with a CPU (Central Processing Unit) and the like. The system control unit 404 outputs the image signal processed by the image processing unit 403 to a recording control unit 406 and a display control unit 407. An operation unit 410 is configured with operation members such as buttons, switches, and electronic dials. When the user operates the operation unit 410, a signal corresponding to the operation content is supplied from the operation unit 410 to the system control unit 404. The display control unit 407 displays the image supplied from the system control unit 404 on a display unit 408. The display control unit 407 can adjust display formats such as resolution, frame rate, luminance range, color gamut, and the like. The display control unit 407 can perform display based on standards such as 8K UHDTV, 4K UHDTV, HDTV and the like. The display unit 408 may be provided in the main body of the image capturing apparatus 400 or may be provided separately from the main body of the image capturing apparatus 400. When the display unit 408 is provided separately from the main body of the image capturing apparatus 400, the display control unit 407 and the display unit 408 are connected by a connection cable, for example. A recording medium 409 is attached to the recording control unit 406. As the recording medium 409, for example, a memory card or the like is used. The recording control unit 406 compresses moving image data including a plurality of frames by a known encoding method such as the MPEG method. The recording control unit 406 writes the compressed moving image data into the recording medium 409 in accordance with a format compatible with a computer such as an exFAT file system. An optical system driving unit 402 controls the focus lens, the zoom lens, the diaphragm, and the like provided in the imaging optical system 401. It should be noted that the image capturing apparatus 400 may further include a wired or wireless communication interface for communicating with an external device. In such case, the image capturing apparatus 400 can transmit the generated image or the like to the external device or the like via the communication interface, and can receive a control signal or the like from the external device. In addition, the image capturing apparatus 400 may further include a light source device for projecting light onto the subject. In that case, the light source device can emit light as a light pulse in synchronization with, for example, the synchronizing signal VD or the like. Alternatively, the light source device can always emit light. Since the subject can be irradiated with light by the light source device, it is possible to more reliably recognize the subject.

Figure 5:
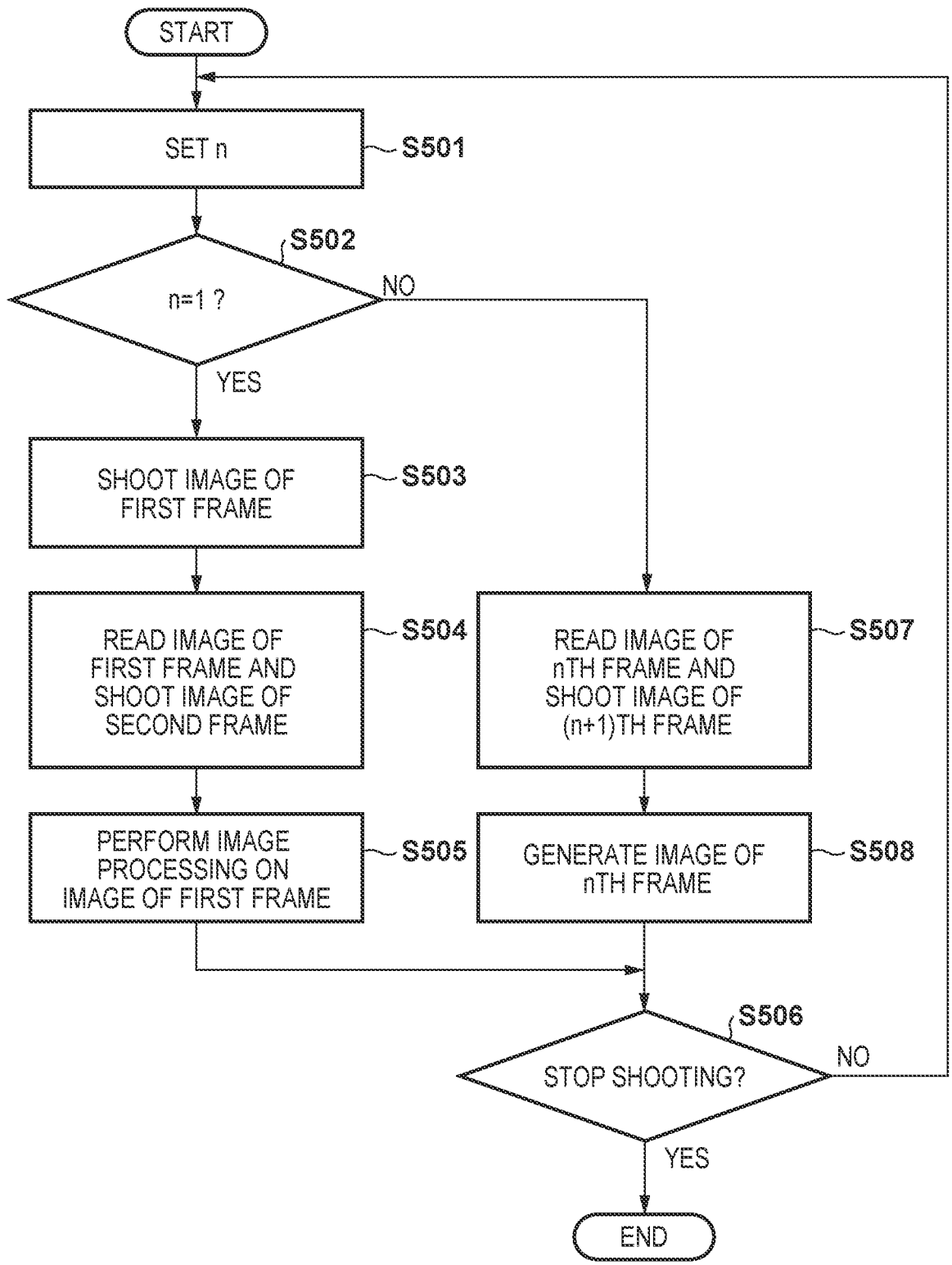
FIG. 5 is a flowchart showing an operation of the image capturing apparatus according to the first embodiment.

FIG. 5 is a flowchart showing the operation of the image capturing apparatus according to the present embodiment.

In step S501, the system control unit 404 sets the value of n. The initial value of n is 1.

In step S502, the system control unit 404 determines whether the value of n is 1 or not. If the value of n is 1 (YES in step S502), the process proceeds to step S503.

In step S503, the system control unit 404 causes the solid-state image sensor 100 to execute the shooting process of the first frame. Thereafter, the process proceeds to step S504.

In step S504, the system control unit 404 causes the solid-state image sensor 100 to execute the read process of the first frame and causes the solid-state image sensor 100 to execute the shooting process of the second frame. Thereafter, the process proceeds to step S505.

In step S505, the system control unit 404 causes the image processing unit 403 to execute the image processing of the first frame and causes the display control unit 407 to display the image using the display unit 408. Thereafter, the process proceeds to step S506.

In step S506, the system control unit 404 determines whether or not to stop shooting. If the shooting is not to be stopped (NO in step S506), the process returns to step S501. When returning to step S501, the system control unit 404 increments the value of n. Thereafter, the process proceeds to step S502. When the value of n is not 1 (NO in step S502), the process proceeds to step S507.

In step S507, the system control unit 404 causes the solid-state image sensor 100 to execute the read process of the nth frame and causes the solid-state image sensor 100 to execute shooting process of the (n+1)th frame.

In step S508, the system control unit 404 causes the image processing unit 403 to execute the generation process of the nth frame and causes the display control unit 407 to display the image using the display unit 408. In the read process of the second and subsequent frames, there may be pixels 110 which are not to be read as described above. Therefore, the image processing unit 403 updates the (n−1)th frame by using the pixel values of the pixels 110 read in the read process of the nth frame, thereby generating the nth frame. For the portion corresponding to the pixel 110 read in the read process of the nth frame, the pixel value is updated. On the other hand, the pixel value is not updated for the portion corresponding to the pixel 110 that has not been read in the read process of the nth frame. Thereafter, the process proceeds to step S506.

When shooting is to be terminated (YES in step S506), the process shown in FIG. 5 ends.

According to the present embodiment as described above, when the change in the number of pulses detected per unit time is larger than the threshold value TH, a signal corresponding to the count value of the counter 204 provided for the pixel 110 is read. When the change in the number of pulses detected per unit time is equal to or less than the threshold value TH, the signal corresponding to the count value of the counter 204 provided for the pixel 110 is not read, so that the time required for reading can be shortened. As the time required for reading can be shortened according to the present embodiment, it is possible to increase the number of pixels, and it is possible to obtain a high resolution image. For example, according to the present embodiment, it is also possible to obtain a high-resolution moving image of a moving subject.

Second Embodiment

A solid-state image sensor, an image capturing apparatus and an imaging method according to the second embodiment will be described with reference to FIGS. 6 and 7. The same components as those of the solid-state image sensor and the like according to the first embodiment shown in FIGS. 1 to 5 are denoted by the same reference numerals, and the description thereof will be omitted or simplified.

The solid-state image sensor according to the present embodiment reads out the count value of a counter 601 provided for the pixel 110 when the change in the number of pulses detected per unit time becomes larger than the threshold value TH.

Figure 6:
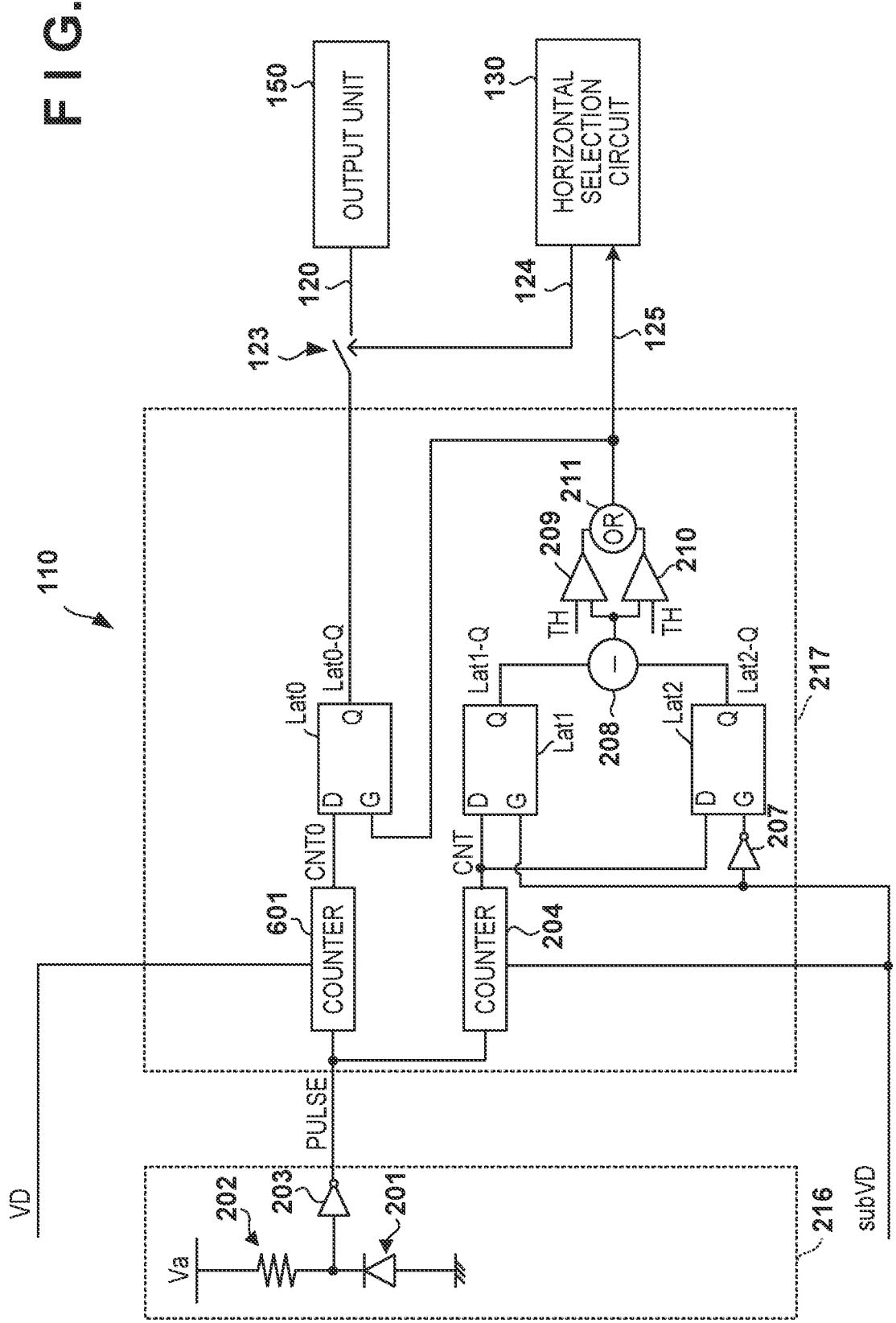
FIG. 6 is a diagram showing a solid-state image sensor according to a second embodiment.

FIG. 6 is a diagram showing a solid-state image sensor according to this embodiment. FIG. 6 shows the pixel 110 provided in the solid-state image sensor according to the present embodiment. In FIG. 6, one pixel 110 out of the plurality of pixels 110 provided in the solid-state image sensor according to the present embodiment is extracted and shown.

A sensor unit 216 is provided with a photodiode 201, a quenching element 202, and an inverter 203 as in the case of the first embodiment. A counting unit 217 is provided with a counter 204, latch circuits Lat1 and Lat2, an inverter 207, a subtracter 208, comparators 209 and 210, an OR circuit 211, the counter 601, and a latch circuit Lat0.

A pulse signal PULSE output from the inverter 203 is input to a clock terminal of the counter 204 and a clock terminal of the counter 601. The counters 204 and 601 respectively count the numbers of the pulse signals PULSE. A synchronizing signal subVD is supplied to a reset terminal of the counter 204. As shown in FIG. 7, the synchronizing signal subVD is, for example, a signal having a duty ratio of 50%. The synchronizing signal subVD can be generated by dividing a synchronizing signal VD. The synchronizing signal VD is supplied to a reset terminal of the counter 601. In the present embodiment, as shown in FIG. 7, a pulsed synchronizing signal VD is used. The period of the synchronizing signal subVD is shorter than the period of the synchronizing signal VD. Here, for the sake of simplicity of explanation, the case where the period of the synchronizing signal subVD is set to about a quarter of the period of the synchronizing signal VD will be described as an example, however, the present invention is not limited thereto. The counter 204 resets a count value CNT to an initial value, that is, 0, when the polarity of the synchronizing signal subVD changes. In other words, the counter 204 resets the count value CNT to the initial value when the synchronizing signal subVD changes from Low level to High level. Further, the counter 204 resets the count value CNT to the initial value when the synchronizing signal subVD changes from High level to Low level. The counter 601 resets a count value CNT0 to an initial value, that is, 0, at the rising edge of the synchronizing signal VD. In other words, the counter 601 resets the count value CNT0 to the initial value when the synchronizing signal VD changes from Low level to High level. The bit width of the counter 204 is set smaller than the bit width of the counter 601. In the present embodiment, the bit width of the counter 204 can be set smaller than the bit width of the counter 601 because the period of the synchronizing signal subVD is smaller than the period of the synchronizing signal VD. When the period of the synchronizing signal subVD is, for example, a quarter of the period of the synchronizing signal VD, the bit width of the counter 204 can be reduced by, for example, 3 from the bit width of the counter 601. When the bit width of the counter 601 is, for example, 16, the bit width of the counter 204 can be 13. Setting the bit width of the counter 204 to be small contributes to miniaturization of the counting unit 217, which in turn can contribute to increasing the number of pixels and the like. Although the case where the period of the synchronizing signal subVD is set to about a quarter of the period of the synchronizing signal VD will be described as an example here, the present invention is not limited thereto. Also, here, the case where the bit width of the counter 601 is 16 and the bit width of the counter 204 is 13 will be described as an example, but the present invention is not limited thereto. The output terminal of counter 204 is connected to D terminals of the latch circuits Lat1 and Lat2. Therefore, the count value CNT output from the counter 204 is respectively input to the D terminals of the latch circuits Lat1 and Lat2. The output terminal of the counter 601 is connected to a D terminal of the latch circuit Lat0. Therefore, the count value CNT0 output from the counter 601 is input to the D terminal of the latch circuit Lat0.

The synchronizing signal subVD is supplied to a G terminal of the latch circuit Lat1. The synchronizing signal subVD is supplied to a G terminal of the latch circuit Lat2 via the inverter 207. The latch circuit Lat1 records the count value CNT output from the counter 204 when the synchronizing signal subVD changes from Low level to High level. On the other hand, the latch circuit Lat2 records the count value CNT output from the counter 204 when the synchronizing signal subVD changes from High level to Low level. A Q terminal of the latch circuit Lat1 is connected to one input terminal of the subtracter 208 and a Q terminal of latch circuit Lat2 is connected to the other input terminal of the subtracter 208. The difference between the count value Lat1-Q output from the Q terminal of the latch circuit Lat1 and the count value Lat2-Q output from the Q terminal of the latch circuit Lat2 is obtained by the subtracter 208. The difference (difference value) obtained by the subtracter 208 is input to the comparators 209 and 210. The comparator 209 judges whether or not the difference value obtained by the subtracter 208 is larger than a threshold value TH, and outputs a High level signal when the difference value is larger than the threshold value TH. The comparator 210 judges whether or not the difference value obtained by the subtracter 208 is smaller than the threshold value −TH. When the difference value is smaller than the threshold value −TH, the comparator 210 outputs a High level signal. The output terminals of the comparators 209 and 210 are connected to input terminals of the OR circuit 211, respectively. When at least one of the signals output from the comparators 209 and 210 goes to High level, the OR circuit 211 outputs a High level signal. A signal output from the OR circuit 211 is input to a G terminal of the latch circuit Lat0. The latch circuit Lat0 records the count value CNT0 output from the counter 601 when the signal output from the OR circuit 211 changes from Low level to High level. A Q terminal of latch circuit Lat0 is connected to the horizontal output line 120 via a switch 123. The signal output from the OR circuit 211 is also input to a horizontal selection circuit 130 via a signal line 125. When the difference between the count values Lat1-Q and Lat2-Q of the latch circuits Lat1 and Lat2 is larger than the threshold value TH, that is, if the pixel 110 is the pixel to be read, the High level signal output from the OR circuit 211 is supplied to the horizontal selection circuit 130. On the other hand, when the difference between the count values Lat1-Q and Lat2-Q of the latch circuits Lat1 and Lat2 is equal to or smaller than the threshold value TH, that is, when the pixel 110 is not the pixel to be read, the Low level signal is supplied to the horizontal selection circuit 130. Therefore, if the pixel 110 is a pixel to be read, for example, "1" is stored, and when the pixel 110 is not a pixel to be read, for example, "0" is stored in the horizontal selection circuit 130. The horizontal selection circuit 130 controls the switch 123 at an appropriate timing so that the signal acquired by the pixel 110 to be read is read out.

For example, when camera shake occurs during shooting, the signal output from the OR circuit 211 changes from Low level to High level, and the count value CNT0 of the counter 601 at that timing is stored in the latch circuit Lat0. Therefore, according to the present embodiment, it is possible to acquire an image with reduced influence of camera shake.

Also, when the object starts to move, the signal output from the OR circuit 211 changes from Low level to High level, and the count value CNT0 of the counter 601 at that timing is stored in the latch circuit Lat0. Therefore, according to the present embodiment, it is also possible to acquire an image at the moment when the subject starts to move.

In the present embodiment, the count value of the counter 601 at the time when the signal output from the OR circuit 211 changes from Low level to High level is acquired. Therefore, in the present embodiment, the image value of the exposure time shorter than the regular exposure time determined by Auto Exposure (AE) or the like is acquired. Therefore, it is preferable to perform gain correction or the like on the acquired pixel value. For example, by supplying information indicating the exposure time to the image processing unit 403, it is possible to perform gain correction by the image processing unit 403 or the like. For example, the output unit 150 attaches information indicating the coordinates (p, q) of the pixel 110 to be read and information indicating the exposure time of the pixel 110 to the output signal OUTPUT. Note that the information indicating the exposure time can be generated based on the number of times the polarity of the subVD signal has changed, for example.

Figure 7:
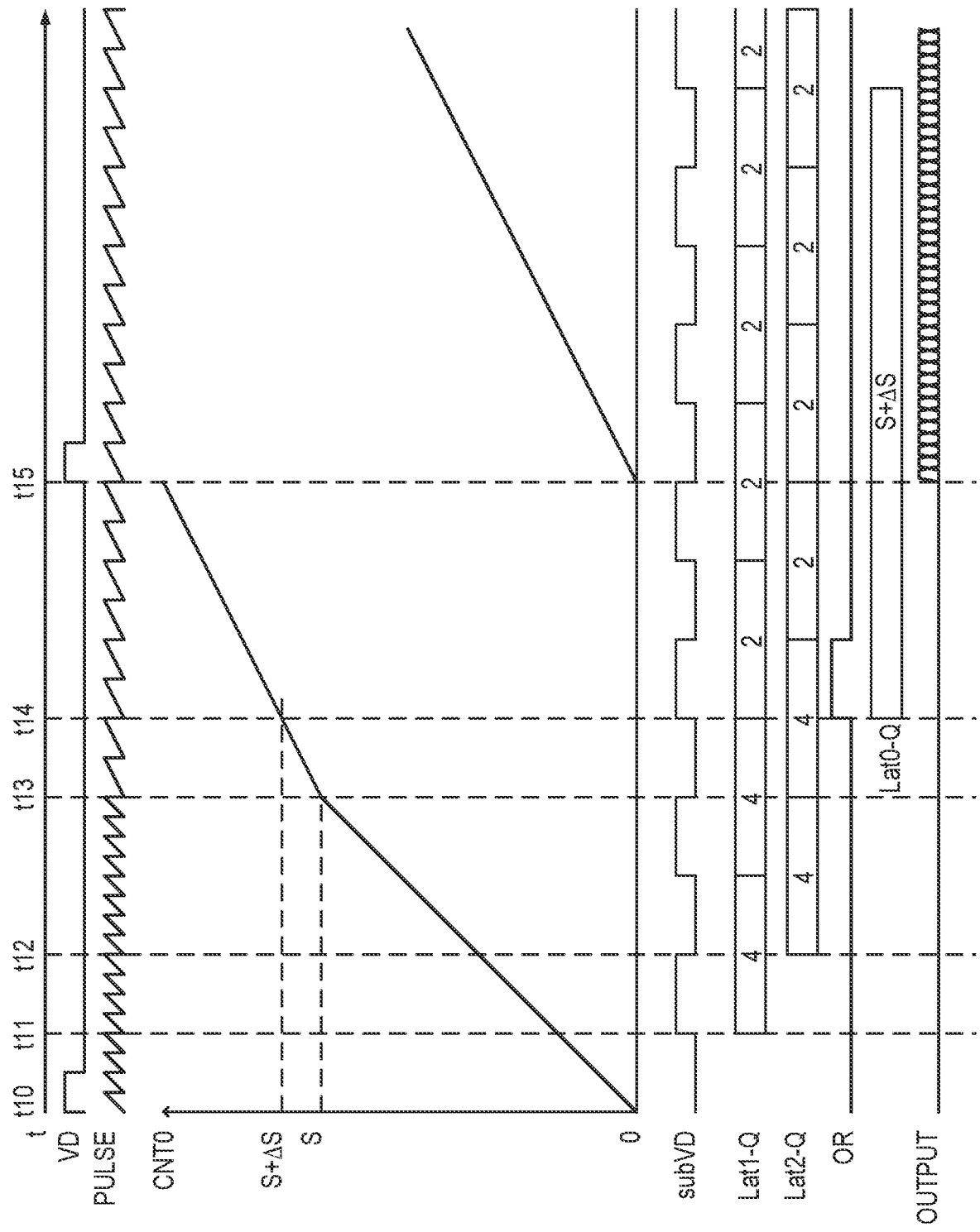
FIG. 7 is a timing chart showing an example of an operation of the solid-state image sensor according to the second embodiment.

FIG. 7 is a timing chart showing an example of the operation of the solid-state image sensor according to the present embodiment. Here, description is made focusing on the operation of one pixel 110 among the plurality of pixels 110. The period from time t10 to time t15, that is, the interval at which the pulsed synchronizing signal VD is supplied corresponds to a shooting period. A period after time t15 corresponds to a reading period.

As shown in FIG. 7, at time t10, the pulsed synchronizing signal VD is supplied. And at time t10, the counter 601 starts counting the pulse signal PULSE.

At time t11, the synchronizing signal subVD changes from Low level to High level. Since the synchronizing signal subVD is input to the G terminal of the latch circuit Lat1, the potential of the G terminal of the latch circuit Lat1 changes from Low level to High level at time t11. When the potential of the G terminal of the latch circuit Lat1 changes from Low level to High level, the latch circuit Lat1 stores the count value CNT input to the D terminal of the latch circuit Lat1. Here, in order to simplify the explanation, the case where the count value CNT is 4 will be described as an example, but the present invention is not limited to this. As the count value CNT of counter 204 at time t11 is 4 here, therefore, the latch circuit Lat1 stores the count value 4. At time t11, the count value CNT stored in the latch circuit Lat2 is assumed to be 4 (not shown). Therefore, the difference between the count values Lat1-Q and Lat2-Q of the latch circuits Lat1 and Lat2 is less than or equal to the threshold value TH, and the signal output from the OR circuit 211 remains at Low level.

At time t12, the synchronizing signal subVD changes from High level to Low level. As a result, the potential of the G terminal of the latch circuit Lat2 changes from Low level to High level. When the potential of the G terminal of the latch circuit Lat2 changes from Low level to High level, the latch circuit Lat2 stores the count value CNT input to the D terminal of the latch circuit Lat2. The count value CNT of the counter 204 at time t12 is 4. Therefore, the latch circuit Lat2 stores the count value 4. At time t12, the count value CNT stored in the latch circuit Lat1 is 4. Therefore, the difference between the count values Lat1-Q and Lat2-Q of the latch circuits Lat1 and Lat2 is equal to or smaller than the threshold value TH, and the signal output from the OR circuit 211 is Low level.

In the example shown in FIG. 7, at time t13, the intensity of the light incident on the pixel 110 decreases. For this reason, increase amounts of the count values CNT and CNT0 per unit time are different before and after time t13. In this case, the count value CNT at time t14 is smaller than the count value CNT at time t13. At time t14, the synchronizing signal subVD changes from the Low level to High level, and the potential of the G terminal of the latch circuit Lat1 changes from Low level to High level. When the potential of the G terminal of the latch circuit Lat1 changes from Low level to High level, the latch circuit Lat1 stores the count value CNT input to the D terminal of the latch circuit Lat1. Here, in order to simplify the explanation, the case where the count value CNT of the counter 204 at time t14 is 2 will be described as an example, but this is not limitative. The count value CNT of counter 204 at time t14 is 2. Therefore, the latch circuit Lat1 stores the count value 2. At time t13, the count value CNT stored in the latch circuit Lat2 is 4. Here, in order to simplify the explanation, a case where the threshold value TH is 1 will be described as an example, but the present invention is not limited thereto. Since the difference between the count values Lat1-Q and Lat2-Q of the latch circuits Lat1 and Lat2 is larger than the threshold value TH, the signal output from the OR circuit 211 changes from Low level to High level. Since the signal supplied from the OR circuit 211 is at High level, the horizontal selection circuit 130 stores the pixel 110 as the pixel to be read. The horizontal selection circuit 130 controls the switch 123 at an appropriate timing so that the signal acquired by the pixel 110 to be read is read out. The High level signal output from the OR circuit 211 is also supplied to the G terminal of the latch circuit Lat0. When the potential of the G terminal of the latch circuit Lat0 changes from Low level to High level, the latch circuit Lat0 stores the count value CNT0 input to the D terminal of the latch circuit Lat0. The count value CNT0 of the counter 601 at time t14 is S+ΔS. ΔS is an increment of the count value CNT0 of the counter 601 from time t13 to time t14. If the period of the synchronizing signal subVD is made sufficiently small with respect to the period of the synchronizing signal VD, ΔS can be reduced to a level that can be sufficiently ignored with respect to S. The Q terminal of latch circuit Lat0 is connected to horizontal output line 120 via the switch 123. A count value Lat0-Q of the latch circuit Lat0 is output from the pixel 110 via the switch 123 and the horizontal output line 120.

After time t15, the output unit 150 outputs the output signal OUTPUT. The image processing unit 403 uses the output signal OUTPUT output from the solid-state image sensor 100 to update a part of the image that has already been acquired before time t15. As described above, the output unit 150 attaches the information indicating the exposure time of the pixel 110 to the output signal OUTPUT. The image processing unit 403 performs gain correction on the signal acquired by the pixel 110 based on the information indicating the exposure time of the pixel 110.

As described above, according to the present embodiment, when the change in the number of pulses detected per unit time becomes larger than the threshold value TH, the count value of the counter 601 provided for the pixel 110 is acquired. Therefore, according to the present embodiment, it is possible to acquire a pixel value using, for example, a change in light intensity as a trigger. Therefore, according to the present embodiment, it is also possible to acquire an image from which the influence of camera shake is reduced, an image at the moment when the subject starts to move, and so forth.

Third Embodiment

A third embodiment of the present invention will be explained next. In the third embodiment, a pixel has a configuration different from the configuration of the pixel 110 explained with reference to FIG. 6 in the second embodiment, and is used in place of the pixel 110. Since the configuration other than the pixel is the same as that of the second embodiment, the configuration of the pixel and its driving method will be described below.

Figure 8:
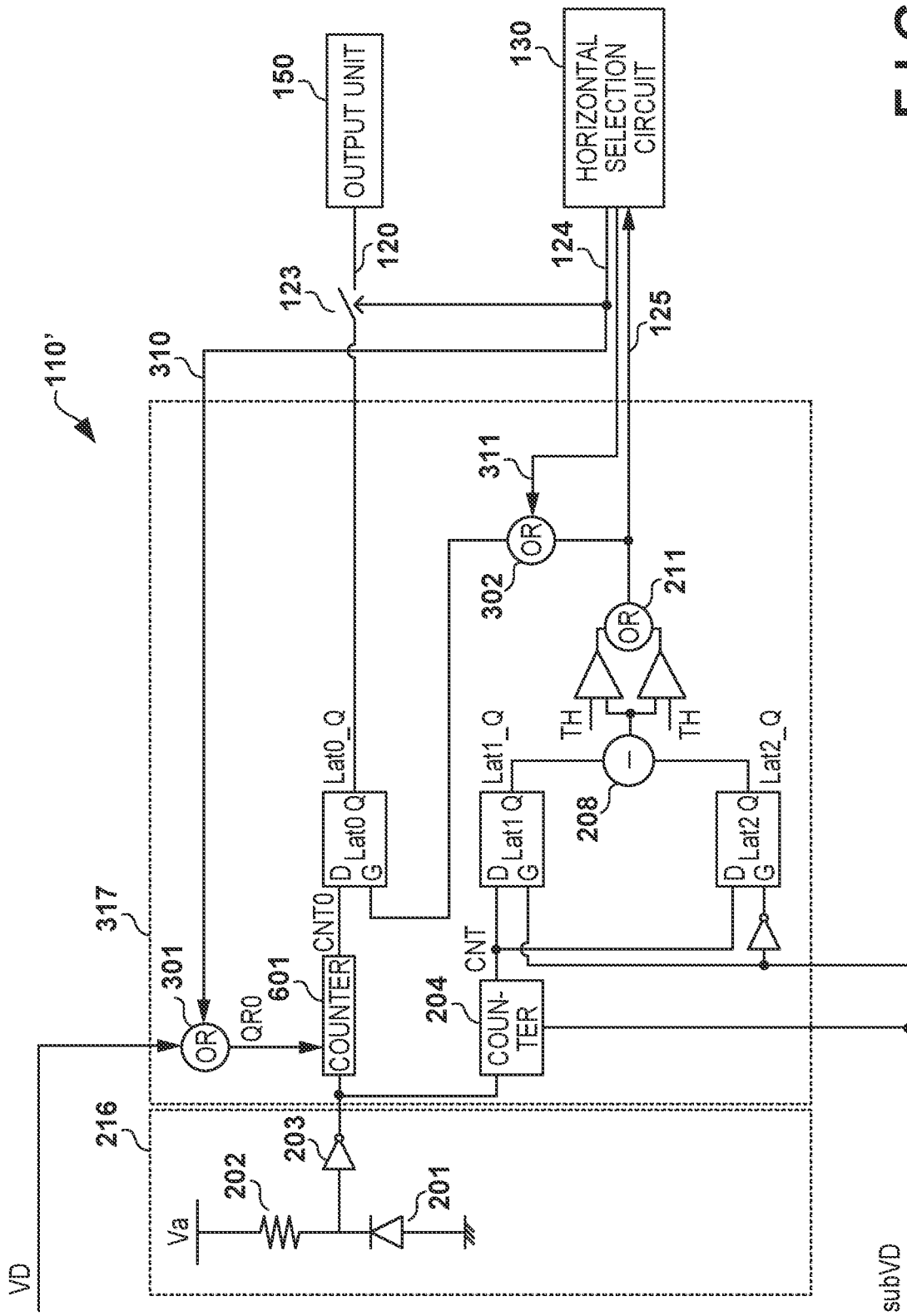
FIG. 8 is a diagram showing a solid-state image sensor according to a third embodiment.

FIG. 8 is a diagram showing a schematic configuration of a pixel 110' according to the third embodiment. In FIG. 8, the same reference numerals are given to the same configurations as those in FIG. 6, and description thereof is omitted as appropriate. As shown in FIG. 8, the pixel 110' in the third embodiment has the configuration such that OR circuits 301 and 302 and signal lines 310 and 311 are added to the configuration shown in FIG. 6. When the difference between the count values Lat1-Q and Lat2-Q of the latch circuits Lat1 and Lat2 becomes larger than the threshold value TH, the OR circuit 211 outputs a signal of High level to the horizontal selection circuit 130 via the signal line 125 as described in the above embodiment.

The horizontal selection circuit 130 outputs a signal from the OR circuit 211 input via the signal line 125 to the signal line 310, and the OR circuit 301 outputs a High level signal in a case where either of the synchronizing signal VD or the signal on the signal line 310 is High level. As a result, at the timing when the synchronizing signal VD goes to High level, or at the timing when the signal delayed by a predetermined time from the timing when the difference between the count values Lat1-Q and Lat2-Q becomes larger than the threshold value TH becomes High level, the counter 601 is reset.

Further, the horizontal selection circuit 130 outputs a High level signal to the signal line 311 at the timing immediately before the counter 601 is reset by the synchronizing signal VD, in a case where the high-level signal is outputted once from the OR circuit 211 during one cycle of the synchronizing signal VD. If the High level signal has been output twice or more from the OR circuit 211, the horizontal selection circuit 130 does not output a High level signal. The OR circuit 302 outputs a High level signal to the G terminal of the latch circuit Lat0 when either the output of the OR circuit 211 or the output to the signal line 311 is at High level, and the latch circuit Lat0 latches the count value CNT0 at that time. As a result, as will be described later, it is possible to output a signal corresponding to the first change occurring during one period of the synchronizing signal VD.

Figure 9:
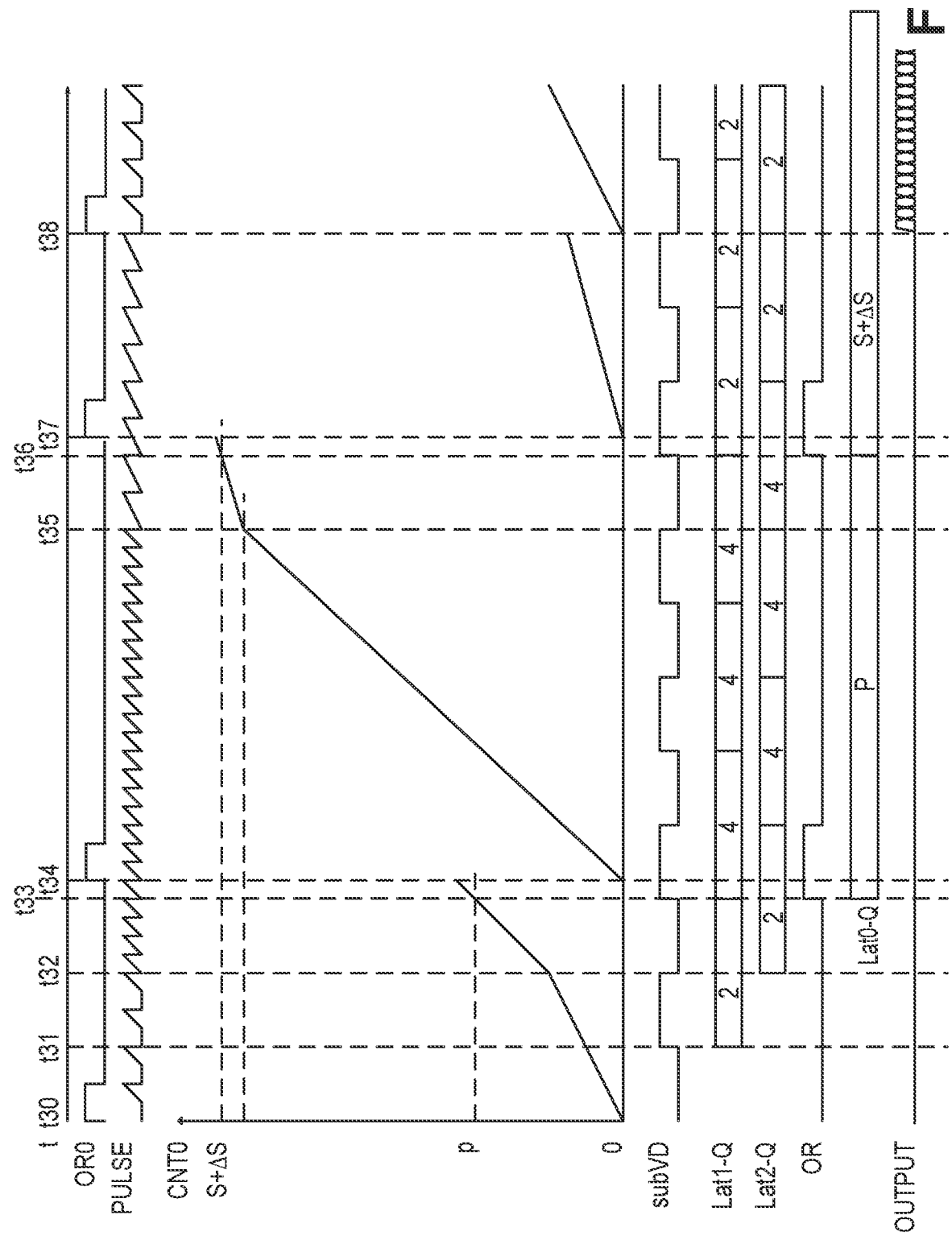
FIG. 9 is a timing chart showing an example of an operation of the solid-state image sensor according to the third embodiment.

FIG. 9 is a timing chart showing an example of the operation of the solid-state image sensor according to the present embodiment. Here, description is made focusing on the operation of one pixel 110' among the plurality of pixels 110'. In the third embodiment, the case where the synchronizing signal subVD is a signal having a duty ratio of 50% and a cycle of one sixth of the cycle of the synchronizing signal VD will be described as an example. However, the present invention is not limited thereto.

The period from time t30 to time t38, that is, the interval at which the pulsed synchronizing signal VD is supplied corresponds to a shooting period. A period after time t38 corresponds to a reading period. As shown in FIG. 9, at time t30, the pulsed synchronizing signal VD is supplied, and the counter 601 starts counting the pulse signal PULSE.

At time t31, the synchronizing signal subVD changes from Low level to High level. Since the synchronizing signal subVD is input to the G terminal of the latch circuit Lat1, the potential of the G terminal of the latch circuit Lat1 changes from Low level to High level. When the potential of the G terminal of the latch circuit Lat1 changes from Low level to High level, the latch circuit Lat1 stores the count value CNT input to the D terminal of the latch circuit Lat1. If the count value CNT of counter 204 is 2 at time t31, the latch circuit Lat1 stores the count value 2. Further, if the count value CNT stored in the latch circuit Lat2 is 2 at time t31, the difference between the count values Lat1-Q and Lat2-Q of the latch circuits Lat1 and Lat2 is less than or equal to the threshold value TH, and the signal output from the OR circuit 211 remains at Low level.

When the synchronizing signal subVD changes from High level to Low level at time t32, the potential of the G terminal of the latch circuit Lat2 changes from Low level to High level, and the latch circuit Lat2 stores the count value CNT input to the D terminal of the latch circuit Lat2. If the count value CNT of the counter 204 at time t32 is 2, the latch circuit Lat2 stores the count value 2. Further, since the count value CNT stored in the latch circuit Lat1 is 2 at time t32, the difference between the count values Lat1-Q and Lat2-Q is equal to or smaller than the threshold value TH, and the signal output from the OR circuit 211 is Low level.

In the example shown in FIG. 9, at time t32, the intensity of the light incident on the pixel 110' increases. For this reason, increase amounts of the count values CNT and CNT0 per unit time are different before and after time t32. In this case, the count value CNT at time t33 is larger than the count value CNT at time t32. Further, when the synchronizing signal subVD changes from the Low level to High level and the potential of the G terminal of the latch circuit Lat1 changes from Low level to High level, the latch circuit Lat1 stores the count value CNT input to the D terminal of the latch circuit Lat1. If the count value CNT of the counter 204 at time t33 is 4, for example, the latch circuit Lat1 stores the count value 4. Further, since the count value CNT stored in the latch circuit Lat2 is 2 at time t33. In a case where the threshold value TH is 1, since the difference between the count values Lat1-Q and Lat2-Q is larger than the threshold value TH, the signal output from the OR circuit 211 changes from Low level to High level. Since the signal supplied from the OR circuit 211 is at High level, the horizontal selection circuit 130 stores the pixel 110' as the pixel to be read. Further, the High level signal output from the OR circuit 211 is also supplied to the latch circuit Lat0 via the OR circuit 302, and the latch circuit Lat0 stores the count value CNT input to the D terminal of the latch circuit Lat0. Here, a count P is stored.

On the other hand, the High level signal output from the OR circuit 211 is sent to the OR circuit 301 from the horizontal selection circuit 130. As a result, the output of the OR circuit 301 becomes High level at timing slightly delayed from time t33, and the counter 601 is reset to 0 at time t34.

Thereafter, when the luminance does not change and the luminance changes at time t35, the intensity of the light incident on the pixel 110' decreases at time t35. Therefore, the increase amounts of the count values CNT and CNT0 per unit time are different before and after the time t35, and the count value CNT at the time t36 becomes larger than the count value CNT at the time t35. Further, when the synchronizing signal subVD changes from Low level to High level and the potential of the G terminal of the latch circuit Lat1 changes from Low level to High level, the latch circuit Lat1 latches the count value CNT input to the D terminal of the latch circuit Lat1. In a case where the count value CNT of the counter 204 at the time t36 is 2, for example, the latch circuit Lat1 stores 2. Further, at the timing t36, the count value CNT stored in the latch circuit Lat2 is 2. In a case where the threshold value TH is 1, for example, since the difference between the count values Lat1-Q and Lat2-Q is larger than the threshold value TH, the signal output from the OR circuit 211 changes from Low level to High level. Since the signal supplied from the OR circuit 211 is at High level, the horizontal selection circuit 130 stores the pixel 110' as a pixel to be read. The High level signal output from the OR circuit 211 is also sent to the latch circuit Lat0 via the OR circuit 302 and the latch circuit Lat0 stores the count value CNT input to the D terminal of the latch circuit Lat0 at this point. Here, it is assumed that the count S+ΔS is stored.

On the other hand, the High level signal output from the OR circuit 211 is sent from the horizontal selection circuit 130 to the OR circuit 301. As a result, the output of the OR circuit 301 becomes High level at a timing slightly delayed from time t36, and the counter 601 is reset to 0 at the time t37. Then, when the synchronizing signal VD becomes the High level at the time t38, the counter 601 is reset to 0.

In the example shown in FIG. 9, since the High level signal has been output twice from the OR circuit 211 and the count S+ΔS is stored in the latch circuit Lat0, the horizontal selection circuit 130 does not output the signal immediately before the synchronizing signal VD. If the High level signal has been output only once from the OR circuit 211, the horizontal selection circuit 130 outputs a High level signal to the signal line 311 immediately before the synchronizing signal VD. In this manner, the count value CNT0 can be stored in the latch Lat0 before the counter 601 is reset.

In a case where the counter 601 is reset during one cycle of the synchronizing signal VD, the information indicating the exposure time is included in the output signal OUTPUT, and the image processing unit 403 performs the gain correction, as described in the second embodiment.

According to the third embodiment as described above, when the change in the number of pulses detected per unit time becomes larger than the threshold value TH, the count value of the counter 601 provided in the pixel 110' is reset, and recounted. Thus, a pixel value can be acquired with a change in light intensity, for example, as a trigger. Therefore, according to the present embodiment, it is also possible to acquire an image in which the influence of camera shake is reduced, an image at the moment when the subject starts to move, and the like.

Other Embodiments

Although preferred embodiments have been described above, the present invention is not limited to these embodiments, and various modifications and changes are possible within the scope of the gist thereof.

For example, in the above embodiments, the case where the image processing unit 403 is provided separately from the solid-state image sensor 100 has been described as an example, however, the image processing unit 403 may be provided in the solid-state image sensor 100.

Further, in the above embodiment, the case where the counters 204 and 601, the latch circuits Lat0, Lat1, Lat2, and so on, are provided for each of the plurality of pixels 110 or 110' has been described as an example, however, the present invention is not limited to this. For example, they may be shared by a plurality of pixels 110 or 110' adjacent to each other.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-132737, filed on Jul. 6, 2017, and No. 2018-109660, filed on Jun. 7, 2018, which are hereby incorporated by reference herein in their entirety.

What is claimed is:

1. A solid-state image sensor comprising:
a plurality of pixels each provided with a sensor unit that generates a pulse signal at a frequency corresponding to a frequency of reception of photons;
a counter that counts a number of pulses generated by the sensor unit;
a first latch unit that stores the count value counted by the counter;
a second latch unit that stores the count value counted by the counter;
an interface that is supplied with a periodic signal from outside of the solid-state image sensor; and
an output unit that outputs a signal corresponding to a count value counted by the counter in a case where change in the number of pulses detected per unit time is greater than a threshold,
wherein the counter is reset on the basis of the periodic signal,
the first latch unit and the second latch unit alternately store the count value counted by the counter based on a cycle of the unit time,
the output unit outputs the signal corresponding to the count value counted by the counter in a case where a difference between the count value stored in the first latch unit and the count value stored in the second latch unit is greater than the threshold, and
each unit is implemented by one or more processors, circuitry or a combination thereof.

2. The solid-state image sensor according to claim 1, wherein the output unit does not output a signal corresponding to the count value counted by the counter in a case where change in the number of pulses detected per unit time is equal to or smaller than the threshold.

3. The solid-state image sensor according to claim 1, wherein the output unit outputs a signal indicating coordinates of the pixel to which the counter is provided together with the signal corresponding to the count value counted by the counter.

4. The solid-state image sensor according to claim 1, wherein the counter is provided for each of the plurality of pixels.

5. The solid-state image sensor according to claim 1, wherein the sensor unit includes an avalanche photodiode.

6. The solid-state image sensor according to claim 1, wherein the plurality of pixels is formed on a first substrate and the counter is formed on a second substrate which is different from the first substrate, and the first substrate and the second substrate are stacked on each other.

7. The solid-state image sensor according to claim 1, wherein a cycle of the periodic signal is a multiple of the cycle of the unit time.

8. A solid-state image sensor comprising:
a plurality of pixels each provided with a sensor unit that generates a pulse signal at a frequency corresponding to a frequency of reception of photons;
a first counter that counts a number of pulses generated by the sensor unit;
a second counter that counts a number of pulses generated by the sensor unit;
a first latch unit that stores the count value counted by the second counter; and
a second latch unit that stores the count value counted by the second counter,
an interface that is supplied with a periodic signal from outside of the solid-state image sensor; and
an output unit that outputs a signal corresponding to a count value counted by the first counter in a case where change in the number of pulses detected per unit time is greater than a threshold,
wherein the first counter and the second counter are reset on the basis of the periodic signal,
the first latch unit and the second latch unit alternately store the count value counted by the second counter based on a cycle of the unit time,
the output unit outputs the signal corresponding to the count value counted by the first counter in a case where a difference between the count value stored in the first latch unit and the count value stored in the second latch unit is greater than the threshold, and
each unit is implemented by one or more processors, circuitry or a combination thereof.

9. The solid-state image sensor according to claim 8, wherein a bit width of the second counter is narrower than a bit width of the first counter.

10. The solid-state image sensor according to claim 8, wherein the output unit outputs information relating to time when the difference between the count value stored in the first latch unit and the count value stored in the second latch unit becomes greater than the threshold together with the signal corresponding to the count value counted by the first counter.

11. The solid-state image sensor according to claim 8, wherein the output unit does not output a signal corresponding to the count value counted by the first counter in a case where change in the number of pulses detected per unit time is equal to or smaller than the threshold.

12. The solid-state image sensor according to claim 8, wherein the output unit outputs a signal indicating coordinates of the pixel to which the first counter is provided together with the signal corresponding to the count value counted by the first counter.

13. The solid-state image sensor according to claim 8, wherein the first counter is provided for each of the plurality of pixels.

14. The solid-state image sensor according to claim 8, wherein the sensor unit includes an avalanche photodiode.

15. The solid-state image sensor according to claim 8, wherein the plurality of pixels is formed on a first substrate and the first counter is formed on a second substrate which is different from the first substrate, and the first substrate and the second substrate are stacked on each other.

16. The solid-state image sensor according to claim 8, wherein a cycle of the periodic signal is a multiple of the cycle of the unit time.

17. A solid-state image sensor comprising:
a plurality of pixels each provided with a sensor unit that generates a pulse signal at a frequency corresponding to a frequency of reception of photons;
a first counter that counts a number of pulses generated by the sensor unit;
a second counter that counts a number of the pulses generated by the sensor unit;
a first latch unit that stores a count value of the second counter; and
a second latch unit that stores a count value of the second counter,
an interface that is supplied with a periodic signal from outside of the solid-state image sensor; and
an output unit that outputs a signal corresponding to a count value counted by the first counter in a case where change in the number of pulses detected per unit time is greater than a threshold,
wherein the first counter and the second counter are reset on the basis of the periodic signal,
the first latch unit and the second latch unit alternately store the count value counted by the second counter based on a cycle of the unit time,
the first counter is reset by a first reset operation of resetting the first counter based on a cycle of the periodic signal, and by a second reset operation of resetting the first counter in a case where a difference between the count value stored in the first latch unit and the count value stored in the second latch unit is larger than the threshold,
the output unit outputs the signal corresponding to the count value of the first counter since the first counter is reset for a first time by the second reset operation after the first counter has been reset by the first reset operation until the first counter is reset by the first reset operation or the second reset operation, and
each unit is implemented by one or more processors, circuitry or a combination thereof.

18. The solid-state image sensor according to claim 17, wherein a bit width of the second counter is narrower than a bit width of the first counter.

19. The solid-state image sensor according to claim 17, wherein the output unit outputs information relating to time since the first counter is reset for a first time by the second reset operation after the first counter has been reset by the first reset operation until the first counter is reset by the first reset operation or the second reset operation together with a signal corresponding to the count value of the first counter.

20. The solid-state image sensor according to claim 17, wherein the output unit does not output a signal corresponding to the count value counted by the first counter in a case where change in the number of pulses detected per unit time is equal to or smaller than the threshold.

21. The solid-state image sensor according to claim 17, wherein the output unit outputs a signal indicating coordinates of the pixel to which the first counter is provided together with the signal corresponding to the count value counted by the first counter.

22. The solid-state image sensor according to claim 17, wherein the first counter is provided for each of the plurality of pixels.

23. The solid-state image sensor according to claim 17, wherein the sensor unit includes an avalanche photodiode.

24. The solid-state image sensor according to claim 17, wherein the plurality of pixels is formed on a first substrate and the first counter is formed on a second substrate which is different from the first substrate, and the first substrate and the second substrate are stacked on each other.

25. The solid-state image sensor according to claim 17, wherein a cycle of the periodic signal is a multiple of the cycle of the unit time.

26. An image capturing apparatus comprising:
   a solid-state image sensor comprising a plurality of pixels each provided with a sensor unit that generates a pulse signal at a frequency corresponding to a frequency of reception of photons, a counter that counts a number of pulses generated by the sensor unit, a first latch unit that stores the count value counted by the counter, a second latch unit that stores the count value counted by the counter, an interface that is supplied with a periodic signal from outside of the solid-state image sensor, and an output unit that outputs a signal corresponding to a count value counted by the counter in a case where change in the number of pulses detected per unit time is greater than a threshold; and
   an image processing unit that performs predetermined image processing using the signal output from the solid-state image sensor,
   wherein the counter is reset on the basis of the periodic signal,
   the first latch unit and the second latch unit alternately store the count value counted by the counter based on a cycle of the unit time,
   the output unit outputs the signal corresponding to the count value counted by the counter in a case where a difference between the count value stored in the first latch unit and the count value stored in the second latch unit is greater than the threshold, and
   each unit is implemented by one or more processors, circuitry or a combination thereof.

27. The image capturing apparatus according to claim 26, wherein the image processing unit updates a portion of an image obtained in advance using the signal output from the solid-state image sensor.

28. An image capturing apparatus comprising:
   a solid-state image sensor comprising:
      a plurality of pixels each provided with a sensor unit that generates a pulse signal at a frequency corresponding to a frequency of reception of photons;
      a first counter that counts a number of pulses generated by the sensor unit;
      a second counter that counts a number of pulses generated by the sensor unit;
      a first latch unit that stores the count value counted by the second counter;
      a second latch unit that stores the count value counted by the second counter;
      an interface that is supplied with a periodic signal from outside of the solid-state image sensor; and
      an output unit that outputs a signal corresponding to a count value counted by the first counter in a case where change in the number of pulses detected per unit time is greater than a threshold; and
   an image processing unit that performs predetermined image processing using the signal output from the solid-state image sensor,
   wherein the first counter and the second counter are reset on the basis of the periodic signal, and
   each unit is implemented by one or more processors, circuitry or a combination thereof.

29. The image capturing apparatus according to claim 28, wherein the image processing unit updates a portion of an image obtained in advance using the signal output from the solid-state image sensor.

30. An image capturing apparatus comprising:
   a solid-state image sensor comprising:
      a plurality of pixels each provided with a sensor unit that generates a pulse signal at a frequency corresponding to a frequency of reception of photons;
      a first counter that counts a number of pulses generated by the sensor unit;
      a second counter that counts a number of the pulses generated by the sensor unit;
      a first latch unit that stores a count value of the second counter;
      a second latch unit that stores a count value of the second counter;
      an interface that is supplied with a periodic signal from outside of the solid-state image sensor; and
      an output unit that outputs a signal corresponding to a count value counted by the first counter in a case where change in the number of pulses detected per unit time is greater than a threshold; and
   an image processing unit that performs predetermined image processing using the signal output from the solid-state image sensor,
   wherein the first counter and the second counter are reset on the basis of the periodic signal,
   the first latch unit and the second latch unit alternately store the count value counted by the second counter based on a cycle of the unit time,
   the first counter is reset by a first reset operation of resetting the first counter based on a cycle of the periodic signal, and by a second reset operation of resetting the first counter in a case where a difference between the count value stored in the first latch unit and the count value stored in the second latch unit is larger than the threshold,
   the output unit outputs the signal corresponding to the count value of the first counter since the first counter is reset for a first time by the second reset operation after the first counter has been reset by the first reset operation until the first counter is reset by the first reset operation or the second reset operation, and
   each unit is implemented by one or more processors, circuitry or a combination thereof.

31. The image capturing apparatus according to claim 30, wherein the image processing unit updates a portion of an image obtained in advance using the signal output from the solid-state image sensor.

* * * * *